US008908666B2

(12) United States Patent
Nixon et al.

(10) Patent No.: US 8,908,666 B2
(45) Date of Patent: Dec. 9, 2014

(54) COMMUNICATING DATA FRAMES ACROSS COMMUNICATION NETWORKS THAT USE INCOMPATIBLE NETWORK ROUTING PROTOCOLS

(75) Inventors: Mark Nixon, Round Rock, TX (US); Song Han, Austin, TX (US); Eric Rotvold, West Saint Paul, MN (US); Deji Chen, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 98 days.

(21) Appl. No.: 13/619,025

(22) Filed: Sep. 14, 2012

(65) Prior Publication Data

US 2013/0070745 A1 Mar. 21, 2013

Related U.S. Application Data

(60) Provisional application No. 61/535,316, filed on Sep. 15, 2011.

(51) Int. Cl.
*H04W 4/00* (2009.01)
*H04L 12/28* (2006.01)
*H04W 84/02* (2009.01)
*H04L 12/741* (2013.01)
*H04L 12/46* (2006.01)
*H04L 29/12* (2006.01)
*H04W 84/22* (2009.01)

(52) U.S. Cl.
CPC ............ *H04L 45/74* (2013.01); *H04L 12/2836* (2013.01); *H04L 61/1511* (2013.01); *H04L 2012/2841* (2013.01); *H04W 84/22* (2013.01); *H04W 84/02* (2013.01); *H04L 12/4633* (2013.01)
USPC ........................................................ 370/338

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS 8,165,141 B2 * 4/2012 Balgard et al. ................ 370/401
8,315,218 B2 * 11/2012 Kim et al. ..................... 370/329

(Continued)

OTHER PUBLICATIONS

Harvan, "Connecting Wireless Sensor Networks to the Internet—a 6lowpan Implementation for TinyOS 2.0," Master's Thesis (2007). Retrieved from the Internet on Dec. 7, 2012: URL:http://www.eecs.jacobs-university.de/archive/msc-2007/harvan.pdf.

(Continued)

*Primary Examiner* — Jung-Jen Liu
(74) *Attorney, Agent, or Firm* — Marshall, Gerstein & Borun LLP

(57) ABSTRACT

A communication method operates to seamlessly transmit internet protocol (IP) data frames, such as IPv6 data frames, over a communication network that uses a non-IP network routing protocol, i.e., a communication network that implements a network routing protocol other than, or that is incompatible with an IP network routing protocol, such as the WirelessHART protocol. This communication method enables, for example, field devices or other intelligent devices within a process plant network that uses a non-IP communication network to perform messaging of IP data frames generated at or to be received by internet protocol enabled devices either within the process plant network or outside of the process plant network.

26 Claims, 16 Drawing Sheets

(56) References Cited

U.S. PATENT DOCUMENTS

| | | | |
|---|---|---|---|
| 8,325,627 B2* | 12/2012 | Pratt et al. | 370/255 |
| 8,472,348 B2* | 6/2013 | Hui et al. | 370/254 |
| 8,654,711 B2* | 2/2014 | Guo et al. | 370/328 |
| 2002/0007414 A1* | 1/2002 | Inoue et al. | 709/230 |
| 2005/0030968 A1* | 2/2005 | Rich et al. | 370/449 |
| 2007/0280144 A1* | 12/2007 | Hodson et al. | 370/312 |
| 2009/0046732 A1* | 2/2009 | Pratt et al. | 370/406 |
| 2009/0161581 A1* | 6/2009 | Kim | 370/254 |
| 2010/0202355 A1* | 8/2010 | Kim et al. | 370/328 |
| 2011/0164551 A1* | 7/2011 | Takebe et al. | 370/315 |
| 2012/0220218 A1* | 8/2012 | Laible et al. | 455/39 |
| 2012/0230446 A1* | 9/2012 | Feng | 375/272 |
| 2013/0094447 A1* | 4/2013 | Gidlund et al. | 370/328 |
| 2013/0142180 A1* | 6/2013 | Gidlund et al. | 370/337 |

OTHER PUBLICATIONS

Montenegro et al., "Transmission of IPv6 Packets Over IEEE 802.15.4 Networks," Microsoft Corporation Network Working Group (2007).

Oliveira et al., "End-to-End Connectivity IPv6 Over Wireless Sensor Networks," Ubiquitous and Future Networks, 2011 Third International Conference, pp. 1-6 (2011).

International Search Report and Written Opinion for Application No. PCT/US2012/055545, dated Dec. 21, 2012.

* cited by examiner

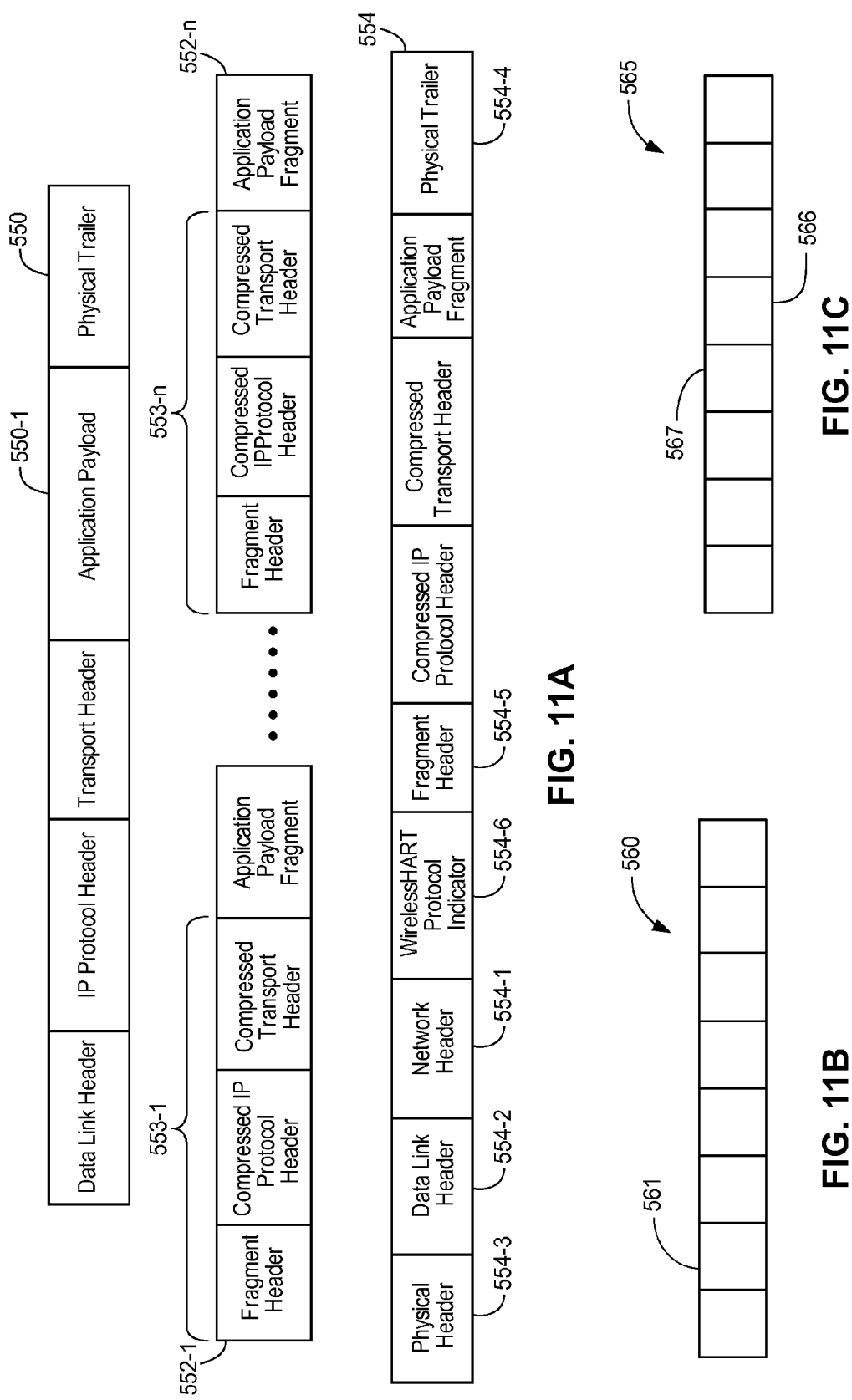

COMMUNICATING DATA FRAMES ACROSS COMMUNICATION NETWORKS THAT USE INCOMPATIBLE NETWORK ROUTING PROTOCOLS

RELATED APPLICATIONS

This application claims the benefit under 35 U.S.C. §119(e) of U.S. Provisional Patent Application Ser. No. 61/535,316, entitled "Method and Apparatus for Communicating Via a Low Power Communication Network," filed Sep. 15, 2011, the entire disclosure of which is hereby expressly incorporated by reference herein.

FIELD OF DISCLOSURE

The present disclosure relates to receiving, processing and transmitting data frames between devices via different communication networks to enable the routing of communication data frames using one network routing protocol to be sent over a network using a second network routing protocol.

BACKGROUND

Initially, process control systems and field devices employed to effectuate process control in process plants were generally monitored and controlled in a decentralized fashion. Lacking standardized communication protocols and computing power, closed loop monitoring and control was something left to a plant operator whose situs was generally local to the process plant itself. The need for remote, centralized process control monitoring and control resulted in the development and deployment of field devices employing, for example, the well-known two-wire, 4-20 mA current loop instrumentation and other point to point hard-wired communication systems.

The availability of low cost, low power computing devices fueled the deployment of intelligent field devices equipped with enhanced processing power (microprocessors) and electrical communication abilities. Intelligent field devices could now increasingly communicate (network) with each other, and with centralized process control systems to perform automated control. This improved networking ability translated to enhanced process plant control and consequently, improved process plant output.

With an eye towards improving acceptance of intelligent field devices in the process control industry, and in part to improve intra-operability between these field devices, field device vendors developed and standardized several digital network protocols to allow for inter-process plant field device communication. Some of the standards, the highway addressable remote transducer (HART) protocol for example, were especially appealing because they leveraged the existing analog two-wire, 4-20 mA infrastructure, by now omnipresent on the process plant floor, to transmit and receive digital information between field devices. Other standards included bus based systems, such as the FOUNDATION® Fieldbus standard, the Profibus standard, etc.

Eventually, increasing computing power, increasing component integration and developments in the general field of signal processing made it economically viable to develop and deploy low-range, low-throughput radio frequency (RF) or wireless communication standards for use in the process control industry. Some of these protocols were developed to operate in the unlicensed or loosely-licensed, industrial, scientific and medical (ISM) electromagnetic frequency bands, such as the 2.4 GHz band. Field devices supporting such low-range, low-throughput RF communication protocols in the ISM band were and continue to be deployed in process plant environments. Although unlicensed, governmental agencies may enact regulations that may limit the maximum transmission power. Thus, frequently such protocols are referred to a low power communication protocols. Moreover, several wired network protocols, including the HART protocol for example, were adapted to leverage the wireless capability of such field devices. In particular, the WirelessHART protocol evolved from the wired HART protocol to leverage and allow interoperability of WirelessHART capable field devices within a wired HART process plant network. Notwithstanding these improvements, process plant communication is generally limited to the process plant environments which have very specific robustness and security issues.

However, in a separate industry, and beginning in approximately the 1960s, personal computers have increasingly become commonplace throughout the world. Simultaneously, strides made in the field of general computer networking have lead to the creation of the internet, via which personal computers seamlessly communicate with one another. This seamless communication has in large part been enabled by the acceptance and adherence to the Internet Protocol version 4 (IPv4). The IPv4 protocol, in part, assigns unique IP addresses to computers communicating via a network, and the internet, in general. Failing to anticipate the widespread acceptance of IPv4, the developers of the IPv4 specification constrained the maximum size of the IP address of a computer to 32 bits. However, the proliferation of internetworked computers, including servers, handheld computers and personal computers has created a situation where IPv4 addresses could run out in the foreseeable future. To preemptively head-off this situation, the newly proposed IPv6 protocol standard, in part, increases the IP address space or length to 128 bits. Mathematically, this translates to 3.4 times $10^{38}$ unique IPv6 addresses. In any event, the use of the Internet Protocol (referred to herein generally as IP or the IP network protocol) to perform routing and other communication activities in both wired and wireless environments has become pervasive. In fact, most applications developed today to communicate outside of a device are developed using the Internet Protocol as the backbone of the communications network or to perform networked communications.

Moreover, the needs in the process plant industry are becoming more and more tied to or intertwined with developments being made in general computing technologies. For example, process plants such as refineries, oil fields and mining operations are increasingly being developed in the remotest corners of the globe, close to the site of the raw materials. Increasing globalization has lead to these plants being owned, monitored and controlled by conglomerates located, if not on separate continents, at least in separate countries. Geo-political instability, climatic conditions and/or the unavailability of livable conditions at the site of such process plants have forced corporations to look for means to remotely monitor and control such process plants. While there are many uses of general computer networking advances being used in other types of networked communications, such as cellular telephone, security monitoring applications, etc., existing process control network protocols are ill-equipped and are generally incompatible with general purpose computer network protocols such as IPv4 or IPv6 to allow integration of these protocols within a process plant environment without significant supporting communications infrastructure. In fact, most of the existing process control network protocols were developed independently of, or without regard to now more commonplace or comprehensive general purpose computer protocols, such as the IPv4 or IPv6 communication protocols. Furthermore, the robust security mechanisms available in the general purpose computer protocols, such as 128 bit encryption, have not made their way to the process plant floor network, again limiting the ability to extend the process plant networks outside of controlled plant environments. In fact, most, if not all process plant communication protocols that implement security features are incompatible with the widely employed IPv4 and IPv6 security protocols.

However, with the newly expanded IPv6 address space, it may now be feasible to assign each intelligent field device within a process plant that is capable of communication with an IPv6 address. Thus, it would be extremely advantageous to simply use a general computer networking protocol, such as IPv4 or IPv6, to perform communications within in a plant environment and to make those communications easily extendable to devices outside of the plant. However, not every intelligent field device is or can easily be adapted to conform to or use the IPv4 or the IPv6 protocol, and thus using the IPv4 or IPv6 communication protocols to perform communications and other routing functions within a process plant environment is not currently feasible. In particular, hardware constraints, such as limited field device memory and processing power, makes it technically unfeasible to retrofit existing field devices with software and or hardware complaint with or needed to support the IPv4 or the IPv6 protocol. Similarly, it is not economically feasible to replace every intelligent field device implementing the existing low-power, low-throughput communication protocols implemented in current special purpose networks, such as those encountered on the process plant floor, with an IPv6-enabled field device. As a result, it is currently not feasible or very practical to use the well known, and now ubiquitous, IPv4 or IPv6 protocols to perform communications within or between devices in a process plant, even though many computing devices within a process plant may benefit from being able to run applications that are developed for use in an IPv4 or IPv6 communication protocol environment or to be able to easily communicate with devices outside the process plant network that use such a communication network protocol. As a result, there is a need for field devices that adapted to operate within the legacy wireless process plant networks while at the same time being adapted to communicate with devices located anywhere on the internet.

SUMMARY

A communication method operates to seamlessly transmit internet protocol (IP) data frames, such as IPv6 data frames, or other types of general purpose computing data frames over a communication network that uses a non-IP network routing protocol, i.e., a communication network that implements a network routing protocol, such as a mesh network routing protocol or an implicit destination or addressing routing protocol that is other than or that is incompatible with an IP network routing protocol, which is a explicit destination addressing protocol. The WirelessHART protocol is an example of a non-IP communication network (that is also an implicit destination or addressing network routing protocol and that uses graph routing at the network layer), and so does not inherently support routing of IP data frames using an IP network routing protocol, e.g., one that use IP address routing or explicit destination addressing. This communication method enables, for example, field devices or other intelligent devices within a process plant network that uses a non-IP communication network (a network that does not use IP based network routing such as the WirelessHART communications protocol) to perform message routing using IP data frames generated and received by internet protocol enabled devices either within the process plant network or outside of the process plant network. Importantly, the communication method does not affect or alter the normal communications within the non-IP communication network because the communication method uses the network routing or network routing protocol structure of the non-IP communication network (such as a mesh network routing protocol or an implicit destination or addressing routing protocol) to transmit the IP data frames within the non-IP communication network, while preserving the IP network routing information of the IP data frames needed to subsequently route the messages in an IP based communications network or to decode and use IP message data frames in an IP enabled device. Generally, this communication method preserves the IP network routing information along the entire network routing path and at the transition points between a non-IP communication network and an IP communication network so that the IP data frame can be used by IP enabled applications within devices (either within the non-IP communication network or outside of the non-IP communication network) to perform standard IP network communications.

Essentially, the communication method described herein uses the network routing structure or mechanisms of the non-IP communication network to transmit and receive IP data frames via communication channels conforming to the non-IP network routing protocol even when the non-IP communication network does not inherently support the transmission of IP data frames or an IP network routing protocol. The communication method generally operates by routing the IP data frames over the non-IP communication network using the network routing mechanism (network routing protocol information) of the non-IP communication network while preserving the IP network routing information (IP network routing protocol information) within the data frame so that this information can be used in an IP communication network by applications that communicate using IP data frames and IP stacks within the devices in which the applications reside. This feature enables standard IP data frames to be sent along with or simultaneously with data frames configured according to a non-IP communication network using the protocol stacks (e.g., data link layer mechanisms and the physical layer structure) of the non-IP communication network. In one case, the method may fragment the IP data frames into one or more fragments and route the fragmented data frames via the communication channels of the non-IP communication network using, for example, the fragmenting technique developed or provided as part of the 6LoWPAN protocol.

Advantageously, the communication method described herein allows an IP communications network to be seamlessly connected to a non-IP communication network, such as specialized communication networks associated with sending process control information, so that IP data frames can be seamlessly communicated across these networks, without needing to significantly change or add to the processing power or capabilities of the devices on the non-IP communication network. Additionally, this communication method enables IP data frames generated at a device operating in the non-IP communication network to be sent directly to a device in an IP compliant communication network (e.g., via the internet), using the network routing mechanism of the non-IP communication network for a portion of the communication path and using the network routing mechanism of the IP communication network for another portion of the communication path, without needing force the non-IP communication network to implement IP network routing. Also, the method enables IP data frames generated within an IP communication network to be sent to and received by devices within a non-IP communication network as IP data frames without needing to provide all of the devices operating within the non-IP communication network with IP enabled stacks to perform communications on the non-IP communication network. As a result, this method enables socket-based applications that are developed to generate, receive and use IP data frames or IP based communications to be executed within devices on a non-IP communication network and still communicate using IP data frames, either to applications in devices on the non-IP communication network or to devices on other networks, such as IP communication networks. As a result, applications that use and rely on IP communications (e.g., sockets-based applications) can be executed on devices within the non-IP communication network and can communicate seamlessly with other applications operating on devices within the non-IP communication network or externally connected to the non-IP communication network, using IP data frames. This advantage provides for a wide range of interoperability of applications used across different types of communication networks.

Moreover, an application programming interface (API) may be used to implement the communication method by providing a programmer with function calls that can be used by applications to generate IP data frames and to send these IP data frames via the network routing mechanism of the non-IP communication network. This API enables programmers to efficiently set up and use socket-based applications within the non-IP communication network to provide for IP based communications both within and outside of the non-IP communication network. Moreover, a programming environment, such as a software development kit (SDK), may assist a user in programming applications to be executed on devices within the non-IP communication network by enabling the user to select a device that operates in a non-IP communication network on which an application is to be executed, to develop an application for the device which generates IP data frames, to send these IP data frames via the network routing mechanism of the non-IP communication network, and to test the application. The programming environment may include routines to transmit the application, once developed, to the device operating in the non-IP communication network in the form of IP data frames.

DESCRIPTION OF THE DRAWINGS

FIG. 11A illustrates the generation of WirelessHART network routing protocol header encapsulated IPv6 data frame fragments from a received IPv6 data frame.

FIG. 11B illustrates an example data field in the WirelessHART network routing protocol header that may be utilized to indicate an IPv6 data frame.

FIG. 11C illustrates an example data field in the WirelessHART network routing protocol header that may be utilized to indicate the several possible security mechanisms that may utilized to receive and transmit an IPv6 data frame.

DETAILED DESCRIPTION

Figure 1:
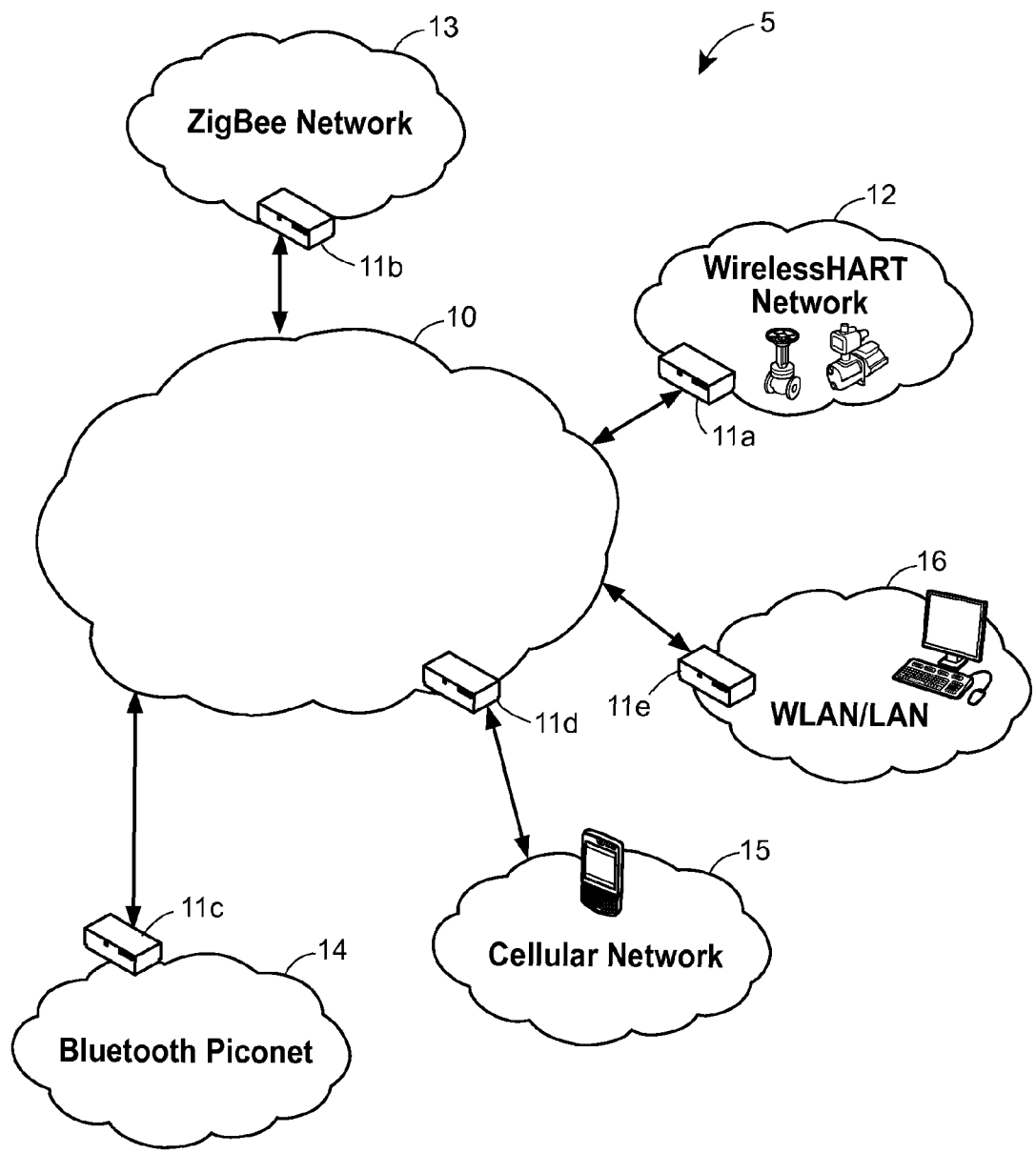
FIG. 1 illustrates an example communication system in which devices in a non-IP communication network can receive and transmit IP data frames within the network or across different communications networks, some of which support an IP network routing protocol and some of which do not support an IP network routing protocol.

Generally speaking, a system and method for seamlessly communicating data frames created based on a first network routing protocol, such as IP data frames, over multiple different communication networks includes creating or receiving data frames configured with network routing protocol information (also referred to as network routing information) associated with a first network routing protocol, e.g., the Internet Protocol version 6 (IPv6) protocol or any other explicit destination or addressing routing protocol or network topology addressing protocol, adding network routing protocol information as defined by a second network routing protocol, such as the WirelessHART network routing protocol or any other mesh network, implicit destination or addressing or non-network topology addressed based routing protocol, while maintaining the first network routing information, and using the network routing mechanisms and procedures of the second communication network to communicate the data frame over the second communication network while maintaining the network routing information of the first network routing protocol within the data frame. Moreover, the system and method may decode the data frame at, for example, a terminal device within the second communication network, such as at a device having an application to which the data frame is directed or a gateway device in the second communication network, and may use the network routing information of the first network routing protocol to direct communication of the original data frame in the communication network conforming to the first network routing protocol, such as the internet, or to respond to the message with a data frame conforming with the first network routing protocol.

As a way of background, there are generally two types of network routing protocols, referred to herein as explicit destination (also called explicit addressing) routing protocols and implicit destination (also referred to herein as implicit addressing) routing protocols. Explicit destination or explicit addressing network routing protocols generally define one or more destinations or destination addresses as part of the network routing information placed inside a data packet routed over the network, which addresses are sufficient for intermediate devices within the network to perform routing within the network. The destination information or destination addresses within the network routing information within the packet being sent explicitly (i.e., in and of themselves) define the device or logical location (the destination) within the network to which the packet is to be delivered. This address information is used (along with routing tables developed by devices in the network) to route the data packet to the destination device associated with the destination address. IP addressing or IP network routing protocols are particular examples of explicit destination or addressing routing protocols because the IP destination address of the data packet is generally the only information needed from the packet to enable devices on the network to route the data packet within the network. In fact, IP addressing uses addresses (e.g., destination addresses) that are a function of the route or network topology needed to reach the device with the destination address. That is, IP addresses are created or are assigned as a function of a location of a device (to which the IP address is assigned) within the topology of the network so as to enable or assist devices routing a packet within the network to send the packet to intermediate devices through which the destination device is reachable. Thus, IP addressing is network topology based or dependent and so is also referred to herein as a network topology based addressing protocol. Many point to point, wired or high power network routing protocols (including IP routing protocols) use explicit destination routing or destination addressing routing (including network topology based addressing) because there is generally little or no concern about a packet being lost (not routed) within the network due to insufficient power in an intermediate routing device or due to loss of a communication channel between devices within the network due to distances between the devices.

On the other hand, implicit destination routing or implicit addressing routing uses other information besides destination addresses within a data packet to define the manner in which the packet is to be routed through a network. Some implicit destination routing techniques, for example, use a concept called graph routing, in which graphs defining various routes through the network are defined and are then used to indicate the manner in which a particular data packet will be routed through the network. With the use of graph routing, each data packet is provided with network routing information in the form of a graph identifier (graph ID) that identifies the graph to be used to perform routing within the network for a particular packet. In some cases, network routing protocols that use graph routing also include one or more destination addresses within the network routing information provided in a packet, but these addresses are used in conjunction with the graph ID or other information within the network routing information of the packet and therefore are not sufficient in and of themselves for performing routing within the communication network. Of course, graph routing is only one example of an implicit destination routing technique.

In fact, many mesh wireless networks use implicit network routing techniques, such as graph routing techniques, because these networks need to assure that data packets are routed in a particular manner through the network to assure connectivity without overburdening the communication stacks or the power (battery) capacity of the devices within the network and because these networks do not use destination addresses for routing, or if they do, do not assign destination addresses in a manner that is dependent on the location of the device within the network (the addresses are not network topology dependent), thereby making it difficult to perform network routing based only on the destination address. For these reasons, most mesh network routing protocols do not use explicit destination routing, such as IP address routing, and are, in fact, incompatible with such routing protocols.

Generally speaking, a mesh network uses a mesh networking (topology) which is a type of networking wherein each node must not only capture and disseminate its own data, but also serves as a relay for other nodes, and thus each node must collaborate to propagate the data in the network. A wireless mesh network (WMN) is a communications network made up of radio nodes organized in a mesh topology. Wireless mesh networks often include mesh clients, mesh routers and gateways. The mesh clients are often laptops, cell phones and other wireless devices while the mesh routers forward traffic to and from the gateways which may but need not connect to the Internet. The coverage area of the radio nodes working as a single network is sometimes called a mesh cloud. Access to this mesh cloud is dependent on the radio nodes working in harmony with each other to create a radio network. A mesh network is reliable and offers redundancy. When one node can no longer operate, the rest of the nodes can still communicate with each other, directly or through one or more intermediate nodes. Examples of mesh network routing techniques include Ad hoc On-Demand Distance Vector Routing used by ZigBee networks, and graph routing employed in WirelessHART networks. In AODV, in order to find the destination device, a device broadcasts out a route request to all of its neighbors. The neighbors then broadcast the request to their neighbors, etc. until the destination is reached. Once the destination is reached, it sends its route reply via unicast transmission following the lowest cost path back to the source. Once the source receives the reply, it will update its routing table for the destination address with the next hop in the path and the path cost. Path cost may include the number of hops which corresponds to the distance.

Referring now to FIG. 1, an example communication system 5 that may be used to implement a communication method that uses the network routing information of multiple different network routing protocols to route data frames or data messages within or across multiple different physical networks associated with different communication networks is illustrated. In this example, the communication method will be used to route or send data frames created using a first network routing protocol, such as an explicit destination routing protocol or a network topology address based protocol, like an IP protocol and in particular an IPv6 network protocol, via one or more communication networks that do not support routing using the first network routing protocol, such as an implicit destination routing protocol like a mesh network routing protocol or a non-network topology based addressing protocol, such as a WirelessHART communication network. Thus, generally speaking, the first network routing protocol described in the examples provided herein will be an IP network routing protocol, such as an IPv4 or an IPv6 network routing protocol that uses IP addressing (which is an explicit destination routing protocol and which is a network topology addressing based protocol) and this IP addressing may be, but is not limited to, for example, a TCP/IP protocol, a UDP/IP protocol, or an ICMP/IP protocol (all generally referred to herein as IP network routing protocols). Moreover, the second network routing protocol will be described in the examples provided below as an implicit destination routing protocol or a non-IP network routing protocol, e.g., a network routing protocol that does not use or support IP addresses or IP routing or network topology based addressing routing protocols. Examples of such protocols include the WirelessHART protocol, the ZigBee protocol, etc. However, it will be understood that other types and particular examples of network routing protocols could be used as the first and second network routing protocols described herein, and that the first and second network routing protocols described herein are not limited to IP and non-IP protocols, respectively. For example, the communication and routing techniques described herein could be used to enable data packets of a first implicit destination routing protocol, or non-IP network routing protocol or non-network topology addressing based protocol to be sent over a communication network that uses a second implicit destination routing protocol or non-IP network routing protocol or non-network topology addressing based protocol. As another example, the communication and routing techniques described herein could be used to enable data packets of a first explicit destination routing protocol that is not an IP network routing protocol to be sent over a communication network that uses a second explicit destination routing protocol (IP or non-IP based) or could be used to enable data packets of a first implicit destination, non-IP or non-network topology based addressing network routing protocol to be sent over a communication network that uses a second explicit destination routing protocol that is not, for example, an P network routing protocol. Of course, other combinations of first and second types of networks could be used as well to implement the communication and routing techniques described herein.

Generally speaking, the communication system 5 of FIG. 1 includes an IP communication network in the form of the internet 10 that connects to one or more other physical networks that may implement either IP network routing protocols or non-IP network routing protocols. In this case, it will be presumed that communications over the internet network 10 use an IPv6 network routing protocol, but the communications over the internet 10 could also or instead use an IPv4 network routing protocol or other IP routing protocol. The communication networks illustrated as being connected to the internet 10 of FIG. 1 include a WirelessHART network 12, a ZIGBEE network 13, a Bluetooth Piconet 14, a cellular network 15 and a wireless local area network (WLAN)/local area network (LAN) 16. As will be understood, the networks 12-16 may implement or use different network routing protocols (also referred to herein as a routing protocol) to perform network communications therein and may use different data link and physical layers protocols to perform these communications. In many cases, such as with the BlueTooth network, the WLAN/LAN network and the cellular network, a communication network may support IP network routing or network topology addressing routing or another explicit destination routing protocol, while in other cases, such as with the WirelessHART network, a communication network may not use or support an IP network routing protocol or a network topology addressing routing or other explicit destination routing protocol, as this network may not use IP addressing for network routing activities. For example, as noted above, the WirelessHART network typically uses a concept called graph routing to perform routing of messages in the WirelessHART network.

The communication method described below may be used to enable a device within the WirelessHART network 12 to create IPv6 or IPv4 data frames and to communicate these data frames over the WirelessHART network 12 using the network routing protocol of the WirelessHART network 12, which is a non-IP network routing protocol as this network routing protocol does not use or support IP addressing for routing purposes. Moreover, as will be understood, the WirelessHART network implements a mesh network routing protocol while the internet 10 and one or more the other communication networks 13-16 may use a non-mesh network routing protocol, such as a point to point routing protocol. In any event, using this communication method, these IPv6 data frames may be sent to and decoded by other devices within the WirelessHART network 12 or by devices in one or more of the other communication networks 13-16 illustrated in FIG. 1. In the same manner, the communication method described below may be used to enable a device within the WirelessHART network 12 to receive and decode IPv6 data frames as IPv6 data frames, and thus use and respond to these data frames in essentially the same manner as if the device were connected to an IP network routing compliant communications network (i.e., a communications network that uses IP network routing mechanisms). In this case, the receiving device within the WirelessHART network 12 may receive the IPv6 data frame from another device within the WirelessHART network 12 or from a device within any one of the other networks 13-16 of FIG. 1.

Generally speaking, to implement the communication method described herein, an IPv6-enabled WirelessHART gateway 11a connects the WirelessHART network 12 to the internet 10. Likewise, as illustrated in FIG. 1, other gateway devices 11b, 11c, 11d and 11e connect each of the ZigBee network 13, the Bluetooth piconet 14, the cellular network 15 and the WLAN/LAN 16 to the internet 10. The gateway devices 11 as well as one or more devices within the communication networks 12-16 may operate to implement steps or aspects of the communication method described in more detail below to enable, for example, IP based communications to occur between two devices (or applications) within the WirelessHART network 12, or between a first device (or application) in the WirelessHART network 12 and a second device (or application) within another one of the networks 13-16.

More particularly, the devices within the WirelessHART network 12 (including the gateway device 11a) may operate to receive and transmit data frames via the physical layers of the WirelessHART network 12 using data frames configured to include both non-IP network routing information and IP network routing information, so as to be able to seamlessly send IP data frames into and out of a communication network that uses a network routing protocol and/or a data link layer protocol that do not use or support IP network routing protocol communications. As an example, the IPv6-enabled WirelessHART gateway 11a of FIG. 1 may receive data frames encapsulated with information according to the IPv6 network routing protocol via the internet 10 wherein such data frames are transmitted through communication channels on the internet 10 using an 802.3 protocol data link layer and/or any standard or supported physical layer within the internet 10. The data frames received from the internet 10 by the IPv6-enabled WirelessHART gateway 11a may have been originally transmitted or created by applications within devices operating in any one of the ZIGBEE network 13, the Bluetooth piconet 14, the cellular network 15 or the WLAN/LAN 16, for example, as standard IPv6 data frames. The IPv6-enabled WirelessHART gateway 11a may operate to then transmit the received IPv6 data frames to network locations (e.g., applications) within devices operating in the WirelessHART network 12 using a WirelessHART compliant network routing protocol to thereby deliver IPv6 messages or data frames between devices located within one of the networks 13-16 and a device located in the WirelessHART network 12. In a similar manner, the WirelessHART gateway 11a may receive data frames or messages developed by IP enabled devices within the WirelessHART network 12 and thus originally encapsulated according to the IPv6 network routing protocol, and then modified and routed via the WirelessHART network 12 using a WirelessHART network routing protocol configured in a manner described in more detail herein. The WirelessHART gateway 11a may receive these data frames or messages via a 802.15.4 data link layer and physical protocol used by the WirelessHART network 12. The IPv6-enabled WirelessHART gateway 11a may then use the IP network routing information within the received message or data frame to send the data frame to a device in one of the other networks 13-16 using IP network routing or addressing. Of course, in this case, the IPv6-enabled WirelessHART gateway 11a operates to transmit the received IPv6 data frames to applications or devices via the internet 10 using standard 802.3 physical layer communication protocol and IPv6 network protocol techniques.

As will be understood, the devices within the WirelessHART network 12 may receive and transmit data frames via communication channels conforming to the 802.15.4 standard. As will be described in more detail below, however, the IPv6-enabled WirelessHART gateway 11a or other IP enabled device on the WirelessHART network 12, when sending an IPv6 data frame over the WirelessHART network 12, may fragment the IPv6 data frame into several fragments according to, for example, the 6LoWPAN standard. In this case, the devices may transmit the IPv6 data frame fragments to WirelessHART devices via communication channels conforming to the WirelessHART network routing protocol and the 802.15.4 data link layer protocol. In this case, the IPv6-enabled WirelessHART gateway 11a may encapsulate the IPv6 data frame fragments with header information corresponding to the WirelessHART network routing protocol to send these IPv6 data frame fragments over the WirelessHART network 12. Thereafter, information included in the WirelessHART protocol header may be utilized by one or more WirelessHART devices in the WirelessHART network 12 to route the IPv6 data frame fragments to the intended WirelessHART device or application. Significantly, WirelessHART devices operating in the WirelessHART network 12 may continue to communicate or exchange non-IP application data or payloads. This promotes backwards compatibility whilst simultaneously allowing intra-network non-IP communication and both intra and inter network IP communication.

To enable the WirelessHART devices on the network 12 to recognize whether a particular WirelessHART message or data frame being routed over the network is a standard WirelessHART message or an encapsulated IPv6 data message, the IPv6-enabled WirelessHART gateway 11a or other device generating the message may include a flag in the WirelessHART network routing information of the data frame that indicates whether that data frame is an IPv6 data frame or a standard WirelessHART data frame. The flag may comprise one or more data fields in the WirelessHART network routing information. Preferably, to promote backward compatibility and inter-operability between non-IP enabled and IP enabled WirelessHART devices, the flag may utilize a previously un-used data field in the WirelessHART network routing information.

As will be understood, when the IPv6 data frames are fragmented and sent over the WirelessHART network 12, the IPv6-enabled WirelessHART gateway 11a or other devices within the WirelessHART network 12 of FIG. 1 will receive IPv6 data frames fragments encapsulated with WirelessHART network routing protocol information via communication channels operating according to the 802.15.4 communication protocol. The IPv6 data frame fragments may, as indicted above, conform to the 6LoWPAN standard. The IPv6-enabled WirelessHART gateway 11a or other WirelessHART device may then detect a flag in the WirelessHART network routing information of a data frame fragment indicating that the data frame corresponds to an IPv6 data frame. In this case, the IPv6-enabled WirelessHART gateway 11a or other WirelessHART device then reassembles the 6LoWPAN data frames to generate an IPv6 data frame. The WirelessHART gateway 11a may then use the IP destination address information of the IPv6 data frame and standard IP routing software and hardware to send the IPv6 data frame to a device within the ZIGBEE network 13, the Bluetooth piconet 14, the cellular network 15 and/or the WLAN/LAN 16 using standard IPv6 communications. Of course, if the IP address of the reassembled data frame indicates an application within the receiving device, the data frame is delivered to the application as a IPv6 data frame and processed according to standard IPv6 compliant techniques.

While the IPv6 enabled communications have been generally described as occurring in FIG. 1 with respect to the non-IP network being the WirelessHART network 12, it will be understood that the same techniques could be used to perform IPv6 based communications within other non-IP networks, such as within the ZIGBEE network 13, the Bluetooth piconet 14, the cellular network 15 and/or the WLAN/LAN 16 (when these networks, for example, use non-IP network routing protocols) using the same techniques described herein, except that, in these cases, the devices on the networks 13-16 will use the physical layer, data link layer and network routing layer protocols that are supported by or specified by these other networks instead of the WirelessHART physical layer, data link layer and network routing layer protocols.

To more fully describe the particular manner in which IP data frames can be encoded and routed via non-IP networks, i.e., networks that do to use an IP network routing protocol to perform network routing, it will be helpful to describe the general manner in which data frames in general and IP data frames in particular, are created and routed via communication networks. First of all, it is important to note that there are a number of different layers or levels at which data frames are created and routed, and it is necessary to understand the manner in which these different levels are interrelated and used in the various different network and communication protocols currently used to perform networked communications. Generally speaking, a data frame that is sent out over a communication network includes information associated with or provided by a number of communication stack layers, typically defined using the Open System Interconnection (OSI) model.

Generally speaking, the OSI model defines a networking framework for implementing network protocols using seven basic layers. Control is passed from one layer to the next, starting at the top layer in one station and proceeding to the bottom layer in that station to create and send a message over the communication channel to the next station. At the receiving station, control is provided to the bottom layer and traverses back up the hierarchy to the top layer to perform decoding of the received message. Generally speaking, the seven layers of the OSI model include the application layer (the top layer referred to as layer 7), the presentation layer (layer 6), the session layer (layer 5), the transport layer (layer 4), the network layer (layer 3), the data link layer (layer 2) and the physical layer (layer 1). Generally, the application layer supports applications and end-user processes. Everything at the application layer is application-specific and the application layer (or application at the application layer) may define communication partners, quality of service, user authentication, privacy, constraints on data syntax, etc. This layer also provides application services for file transfers, e-mail, and other network services. The presentation layer, also sometimes called the syntax layer, provides independence from differences in data representation (e.g., encryption) by translating from the application format to a network format, and vice versa. Thus, the presentation layer works to transform data into the form that the application layer can accept if this data has been encoded or encrypted, for example. This layer thus formats and encrypts data to be sent across a network, which reduces or eliminates compatibility problems.

The session layer establishes, manages and terminates connections between applications and generally sets up, coordinates, and terminates conversations, exchanges, and dialogues between the applications at each end of the communications. The session layer also deals with session and connection coordination. The transport layer provides transparent transfer of data between end systems, or hosts, and is responsible for end-to-end error recovery and flow control. This layer thus ensures complete data transfer. The network layer describes how a series of exchanges over various data links can deliver data between any two nodes in a network. The network layer defines the addressing, switching and routing structure of the network, and creates or defines logical paths, known as virtual circuits for transmitting data from node to node. Importantly, the network layer defines network routing and forwarding functions as well as network addressing schemes, internet working, error handling, congestion control and packet sequencing.

The data link layer encodes and decodes data packets from and into bits and describes the logical organization of data bits transmitted on a particular medium. This layer defines the framing, addressing and check summing (error handling) of packets at the physical layer. The data link layer is generally divided into two sub layers including the Media Access Control (MAC) layer and the Logical Link Control (LLC) layer. The MAC sub layer controls how a computer on the network gains access to the data and permission to transmit this data. The LLC layer controls frame synchronization, flow control and error checking. The physical layer conveys the bit stream via, for example, electrical impulses, light or radio signals, through the network at the electrical and mechanical level. The physical layer provides the hardware means of sending and receiving data on a carrier, including defining cables, cards and physical aspects of the network hardware.

Importantly, a number of protocols have been defined for some of these layers including, most notably, for the transport layer (layer 4), the network layer (layer 3), the data link layer (layer 2) and the physical layer (layer 1). For example, various transport layer protocols exist including the universal datagram protocol (UDP), the transmission control protocol (TCP), and the internet control message protocol (ICMP). These protocols provide particular transport layer rules and procedures to be used with, for example, an IP network layer protocol. Additionally, various network layer protocols exist including, most prevalently, IP protocols, such as the IPv4 and IPv6 network layer protocols, and many non-IP network layer protocols including WirelessHART network layer protocols. Network layer protocols generally define the rules and procedures used to route messages or data frames from one logic point in the network to another logical point in the network and still further define the network layer information needed to be placed into a data packet to enable the network routing to occur. Network layer protocols are also referred to herein as network routing protocols. Still further, various physical layer or data link layer protocols have been defined, including for example, the 802.3 data link layer protocol (Ethernet), the 802.15.4 physical layer protocol (e.g., used by the WirelessHART physical layer protocol), etc. It will be understood that various different networks may use the same network layer protocol while using different data link layer protocols or vice versa. Moreover, certain data link layer protocols may be incompatible with certain network layer protocols. A common reason for this problem is that the network layer protocol may define a maximum message size or length that is longer than the message size allowed by a data link layer protocol.

Although the communication techniques described herein may utilize the several layers described above, in some implementations the communication methods may eschew the "layered" approach and implement the functionality described below as a single monolithic block of instructions. This approach is particularly attractive when implementing the communication methods in memory-constrained devices. However, the single monolithic block of instructions still includes elements or stack elements used in the layered approach described herein.

Typically, a computing device and/or applications resident in the computing device may utilize network or communication stacks to implement or traverse down the various layer of the OSI model to create (encode) a message to be sent over a physical layer of the communication network to which the device is connected to, or up the various layers of the OSI model to decode a message received on the physical layer of the communication network. The communication stack of the device may thus comprise applications executed in a processor that implement procedures defined by the various protocols at the various layers of the stack to package or encapsulate data frames according to the particular protocols before transmitting the data frames or to unpackage or decode data frames received at the device to provide a decoded message to an application to which the message is directed. Packaging a data frame according to a protocol may include appending header and/or trailer information, as defined by the protocol of the layer currently operating on the data frame and then handing that data frame to the next lower layer of the stack. Similarly, un-packaging the data frame includes removing and decoding header and/or trailer information from the data frame for the particular layer of the stack and handing the unpacked data frame to the next higher layer in the stack. The information in the header and/or trailer section of a data frame for a particular layer in the stack typically conforms to rules defined by the particular protocol standard at the appropriate layer. For example, packaging a data frame according to the TCP/IP protocol includes appending a TCP header to the data frame (at the transport layer of the stack) and subsequently appending an IP header to the resulting data frame (at the network layer of the stack). The TCP header conforms to the TCP protocol and the IP header conforms to the IPv4 or IPv6 standard, for example. Particulars of the IPv6 protocol are described in a specification available at http://www.ietf.org/rfc/rfc2460.txt. Examples of other network layer protocols include the WirelessHART protocol, the ZigBee network layer protocol, etc. Of course, a data frame packaged according to a particular network protocol may be transmitted via communication channels that conform to any one of a set of data link layer protocols or physical layer protocols, such as the 802.3 standard (Ethernet), the 802.11a/b/g/n standard (Wi-Fi), the 802.15.4 standard, the 802.16 standard (Wimax), cellular standards such as CDMA, GSM, LTE etc.

Figure 2A:
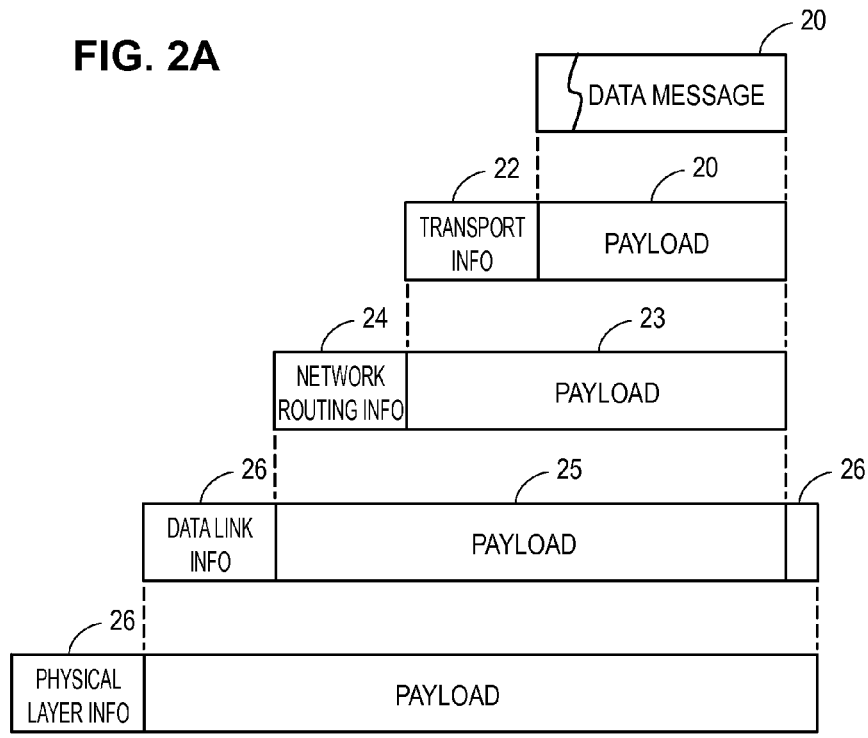
FIG. 2A illustrates the creation of a standard IP data frame within a communications stack of a networked device.

FIG. 2A depicts a chart illustrating a manner of creating a data frame or a data message as the data frame or data message processes down through the various OSI layers of the communications stack of a device. In particular, an application (at the application layer) creates an original data message 20 as a set of bits and bytes defined in any desired manner by the application and provides this message to the transport layer. Generally, "providing" a message to a layer may be accomplished by invoking an application programming interface (API) or "wrapper" for the layer. One of ordinary skill in the art may also provide a message by "calling a wrapper function" for a layer. (Here, the details of the session and presentation layers will not be discussed in detail and will assumed to be fulfilled at the transport layer of the stack.) The transport layer of the stack treats the data message from the application as a payload (as illustrated in FIG. 2) and appends header (and possibly trailer) information thereto as defined by the transport layer protocol being used. The header (and possibly trailer) information, referred to herein as transport layer information 22, may include a definition of the session information (e.g., a session ID), a definition or indication of the type of transport protocol being used, etc. The resulting message 23 is provided to the network layer of the stack which treats the message 23 from the transport layer as a payload, as illustrated in FIG. 2. At the network layer, network routing information or network routing protocol information 24 is appended to the payload 23 in the form of additional header and trailer information (illustrated in FIG. 2 as header sections). The network routing information 24 may include, for example, identifications of the network source and destination (such as a source IP address and a destination IP address for IP network routing protocols or graph IDs for the WirelessHART network routing protocol), timeout information (time to live information), check sum information, length of the message or payload information, flags used for various purposes, etc.

Thereafter the message as created by the network layer is provided to the data link layer where the message created by the network layer is treated as a payload 25 and additional data link information 26 is added in the form of header and/or trailer sections as defined by the data link protocol being used in the communication network. In particular, the data link layer typically adds data link information in the form of device source and destination identifications (such as source and destination MAC addresses), media control information such as stop and start bits, flow control bits, length information, check sum information, fragmentation information including order information, etc. In some cases, the applications associated with the physical layer of the stack add physical layer protocol information to the data frame.

The message, as created by the data link layer is output onto the physical layer and sent over the physical layer to the device as defined by the destination address in the data link header information 26. As will be understood, when being decoded within a device, the message proceeds up the stack of the receiving device with each layer of the stack striping off the appropriate header and trailer information used by the layer to decode the message and perform appropriate processing of the message. Thus, at a receiving device, the data link layer of the stack will strip off and decode the data link header and trailer information 26 to determine if the message has been received correctly and is addressed to this device (as defined by, for example, the MAC address within the data link information 26). If so, the payload portion 25 of the message at the data link layer is provided to the network layer which strips off the network layer header and trailer information 24 to determine the sending and receiving network addresses or other routing information. The network layer of the stack may use this network routing information to determine the logical point within the network that is to receive this message and the appropriate manner of routing this message to the correct point in the network. Assuming that the network address or logical point in the network is associated with the receiving device or an application within the receiving device, the remaining payload 23 is then provided to the transport layer which strips off and decodes the transport layer information 22 to determine the transport layer protocol to use on the message, the data types, etc. used by the transport layer of the stack to process the message prior to giving the remaining message 20 to the appropriate application within the application layer.

As will be understood, network routing information (or network protocol information) generally includes information corresponding to the logical address of a computing device or application that is the intended recipient of the data frame. The network routing information of the data frame may also include information corresponding to the logical address of the computing device which transmitted the data frame. For example, the IP header of the IP network protocol encapsulating a data frame includes a source IP address and a destination IP address. The source IP address corresponds to the logical address of the computing device or application transmitting the data frame and the destination IP address corresponds to the logical address of the computing device or application that is the intended recipient of the data frame. (Computing devices may have more than one logical IP address). Intermediate devices such as routers, for example, utilize the IP addresses to "route" or forward the data frame to the computing device that is the intended recipient of the data frame.

The communication method described herein, however, alters the data frame creation and decoding process described above to provide for the ability to create data messages compliant with and decodable using a first network routing protocol or technique (such as an explicit destination or addressing routing technique, a non-mesh network routing technique or a network topology addressing based routing technique) but which are sent via a communication network that uses a second and different network routing protocol or technique (such as an implicit destination or addressing routing technique, a mesh network routing technique or non-network topology addressing based technique). Generally speaking, the new communication method creates a message having network routing information or network protocol information associated with multiple different network routing protocols encoded into the message as the message is sent over the communication network. This feature enables a message to be created as a message to be sent using a first network routing protocol, but then allows the message to be actually sent over a communication network that uses or conforms to the second network routing protocol. Additionally, the message may be easily converted at gateway devices disposed at the junction between two communication networks using the different network routing protocols without needing to decode the message up to the application layer. Instead, the gateway device only needs to strip off the second network routing protocol information when delivering a message from the second network to the first network or to add the second network routing protocol information when sending the message into the second network to be received by a device in the second network.

Figure 2B:
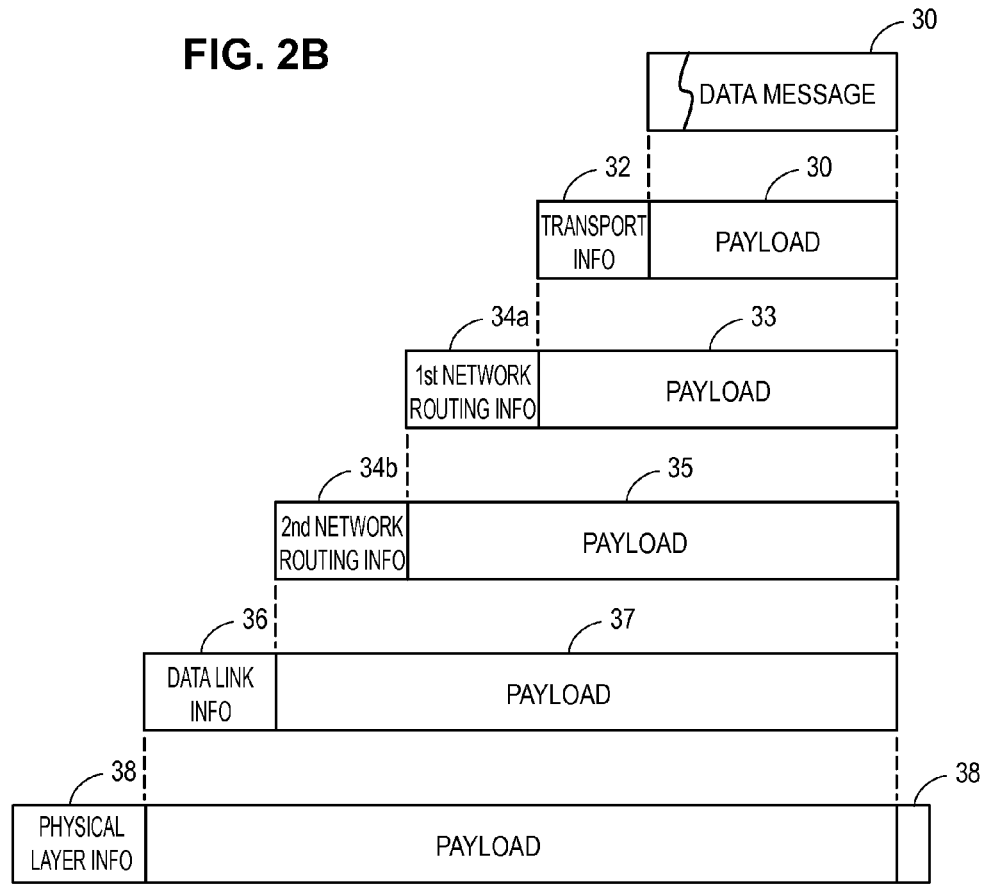
FIG. 2B illustrates the creation of an IP data frame according to the communication method described herein to enable the IP data frame to be routed on a non-IP communication network.
Figure 3:
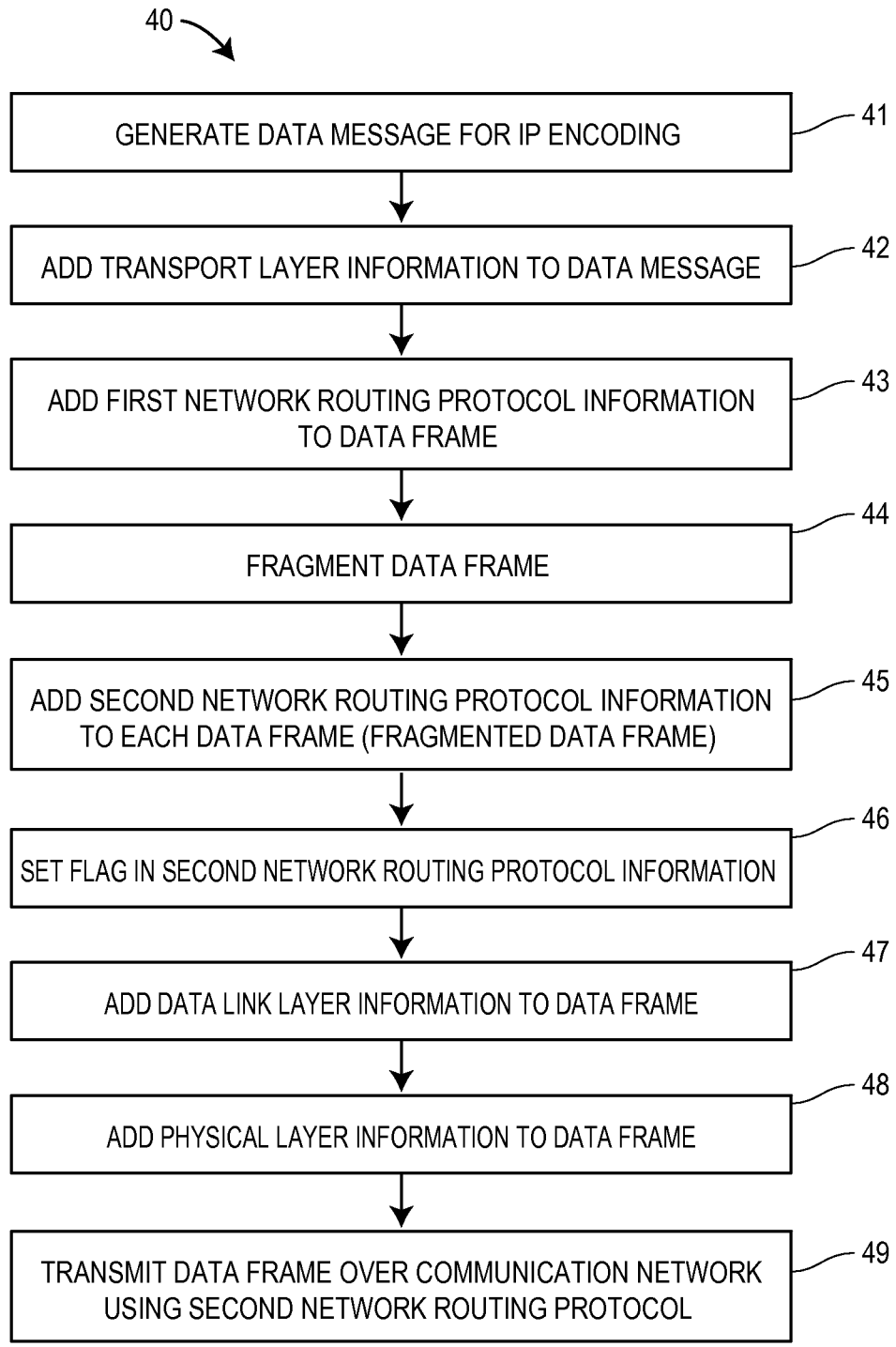
FIG. 3 illustrates a method of creating and sending IP data frames via a non-IP communication network that does not use or support an IP network routing protocol.

FIGS. 2B and 3 will be used to describe a method of creating an IP data frame in, for example, an IP enabled WirelessHART device that is capable of being routed over a WirelessHART communication network and decoded by another IP enabled WirelessHART device, such as an IP enabled WirelessHART gateway, on the WirelessHART communication network as an IP data frame. In particular, FIG. 2B illustrates a data frame as this data frame is created according to the communication technique described herein while FIG. 3 depicts a flow chart 40 illustrating the steps of the communication technique used to generate the data frame of FIG. 2B.

In particular, at a block 41 of the flow chart 40 of FIG. 3, an application at the application layer of the WirelessHART device generates a data message 30 (FIG. 2B) assuming that the message 30 will be encoded and sent using standard IP routing, such as that provided by the IPv4 or IPv6 protocol. If desired, this or another application within the application layer of the WirelessHART device may first send a message to a gateway device (over the WirelessHART network using WirelessHART network routing protocol) requesting that the gateway device perform or implement DNS (domain name system) services and to provide the WirelessHART device with an IP address (e.g., an IPv6 or IPv4 address) for a particular network entity, such as a device, a website, a server, a router, an e-mail recipient, etc. In this case, the WirelessHART device may initially provide a domain name for the network entity (e.g., an entity in the second or IP network), such as a web site host name or an e-mail server host name, or any other name used by DNS services. After obtaining the IP address for the network entity via the DNS services (which may be implemented in the gateway or another device on the IP network), the gateway device then returns the IP address for the network entity to the application within the WirelessHART device over the WirelessHART network using the WirelessHART network routing protocol, and the application may then use this IP address for communicating using IPv6 or IPv4 data packets. The application may be a sockets based application that uses IP based socket addressing to perform communications with other IP enabled devices.

In any event, at a block 42, the application message is processed in the transport layer of the stack of the IP enabled WirelessHART device which adds typical IP based transport layer information, such as TCP header and trailer information to the data message 30 (which is treated as the payload section of the data frame being created at the transport layer of the stack).

Next, a block 43, which may be performed at a network layer of the stack of the IP enabled device, adds IP compliant network routing information, such as IP source and destination address information, data packet length information, etc., to the data frame. This IP network routing information is illustrated in FIG. 2B as header information 34*a* and is illustrated as being associated with or defined by a first network routing protocol (in this case an IP network routing protocol). As noted above, the IP destination address may be obtained via communications with a gateway device that performs or calls DNS services to determine an IP destination address. Next, if desired, a block 44 of FIG. 3 may fragment the data frame produced by the block 43 to enable the IP data frame produced by the block 43 to be sent out over a communications network using a network routing protocol, a data link layer protocol or a physical layer protocol that does not support data frames of the size or length supported by IP network routing. Such fragmentation is common in low power IP networks which generally limit the size or length of the data packets sent therein to a length that is less than the size supported by traditional IP network routing. One common fragmentation technique that is used in lower power IP networks is the 6LoWPAN protocol which fragments each IPv6 data packet over a certain size into multiple packets or fragmented data frames that have a length or size that is supported by the data link and physical layer protocols of the network. While the 6LoWPAN fragmentation technique is described as being used herein for fragmentation and defragmentation purposes, other types of fragmentation techniques could be used as well. Additionally, in some situations, for example, in the case in which a second network routing protocol or physical network supports data frames of the length or size of the first network protocol, no fragmentation may be needed. In these cases, the block 44 could be skipped.

In any event, assuming fragmentation is performed, a block 46 (which may be performed at a network layer of the stack associated with performing network routing using the second network routing protocol) treats the data packet from the block 44 as a payload and adds network routing information as defined by the second network routing protocol to each data frame or fragmented data frame. A data packet at this point is illustrated in FIG. 2B as including second network routing information 34*b* as header information added to the packet 35 created by the block 43 (or the block 44). This second network routing information 34*b* may include, for example, a graph ID for graph routing within a WirelessHART network as well as other network routing information for the data packet as defined by, for example, the WirelessHART network routing layer of the WirelessHART protocol. Of course, other network routing protocols such as other mesh networking, implicit destination or addressing, non-network topology addressing based or non-IP network routing protocols, could be used as the second network routing protocol. Additionally, as part of the network routing information added to the data packet at this level, the block 46 adds or sets a flag (such as a one bit flag illustrated in FIG. 2B as a bit 39) in an otherwise unused portion or bit of the network routing information 34b to indicate that the underlying data packet or data frame 35 is actually a data frame associated with the first network routing protocol and not the second network routing protocol. More particularly, there are typically unused bits or bytes in the network routing information added to each data packet by a particular network routing protocol. The device decoding the network routing protocol typically ignores these bits during the decoding process. In this case, however, one or more of these otherwise unused bits or bytes may be used as a flag to indicate whether the underlying data packet is one that is originally associated with the first network routing protocol or the second network routing protocol. For example, setting a particular bit in the network routing information 34b for the second network routing protocol to a "1" may indicate that the underlying data packet 35 is an IPv6 data packet while setting this particular bit in the network routing information for the second network routing protocol to a "0" may indicate that the underlying data is data originally created or encapsulated using the second network routing protocol (e.g., a data frame originally created as a WirelessHART data frame). Of course, such flags or indications may be any desired length, such as a single bit, multiple bits, a byte, multiple bytes, etc.

Next, at a block 47 of FIG. 3, a data link layer of the stack may add data link information 36 (in the form of header and/or trailer information) to the resultant packet 37 created by the block 46 with the data link layer information 36 being defined by the particular data link protocol being using in the second communication network. A block 48 may then added physical layer information 38 to the resultant packet from the block 47 as defined by the physical layer of the second communication network. A block 49 may then send or transmit the data packet (having both network routing information for both a first and a second network routing protocol therein).

Generally speaking, at a receiving device within the communication network using the second network routing protocol (i.e., the second communication network), the various physical and data link layer information of the packets will be stripped off and decoded and used in typical manners. Moreover, the stack of the receiving device will have a network layer that strips of and decodes the network routing information for the second network routing protocol. During this process, the network layer of the stack of the receiving device will decode the particular bit or byte of this second network routing information being used as a flag or other indication to indicate whether the underlying data packet is a first or second network routing protocol packet, and will use that information for further processing. In particular, if the flag or indication, as decoded, indicates that the underlying packet is a typical or normal packet using the second network routing protocol, the packet is handed to a transport layer of the stack that operates according to the second communications network protocol. If, on the other hand, the flag or other indication as decoded indicates that the underlying packet is an IPv6 packet, for example (i.e., associated with the first network routing protocol), the packet is then handed to a network layer of the stack that handles decoding and routing of packets according to the first network routing protocol. In the case in which the packet is an IPv6 packet, for example, the network stack may defragment the packets by putting a series of received packets together to form the original IPv6 packet, and then may provide the defragmented IPv6 packet to a transport layer of the stack configured according to the first network communications protocol to perform transport layer decoding and processing in the typical manner. In this way, the IPv6 packet is provided to the correct application within the device for processing or may be routed over another network using IP network routing.

As will be understood, however, the data packets created using a first network communication protocol (i.e., one that relies on a first network routing protocol) are sent out over the second communication network (which uses a second network routing protocol for routing communications) include network routing information for or as defined by both the first network routing protocol and the second network routing protocol. This communication technique enables data packets to be created conforming to or assuming that they will be transmitted over a network using a first network communications protocol (that relies on a first network routing protocol such as an IP network routing protocol) in any device, even devices connected to a communication network that does not use the first network routing protocol for network communications. This communication technique also enables devices on a second communication network that does not use the first network routing protocol to send and receive data packets created according to the first network routing protocol over the second communications network, even when that second communication network does not use or support routing using the first network routing protocol. This feature enables devices on the second communication network to communicate with each other using data packets that conform to the first network routing protocol and additionally enables device on the second communication network to communicate directly with devices on a different communication network (e.g., a network that supports routing using a first network routing protocol) using data packets configured according to the first network routing protocol.

A number of example of types of communications that can occur using this communication technique will now be discussed in more detail. In some of the examples provided below, a first computing device on a first communication network creates data frames according to one network communication protocol using a first network routing protocol, for example TCP/IP, and transmits these data frames to a second computing device that is located on a second communication network that uses a second network routing protocol, for example the WirelessHART protocol. (As noted above, however, other types or specific examples of network routing protocols could be used in the first and second communication networks.) In the examples below, the first computing device may transmit the data frames via communication channels that conform to a data link layer communication protocol, such as the 802.3 standard and the second computing device may receive the data frames via communication channels that conform to the same or to a different data link protocol, such as the 802.15.4 standard. As used herein, a data link protocol is also generally referred to as a physical layer protocol.

As noted above, data link protocols or standards define, among other things, the maximum size of a data frame that may be transmitted or received during a communication transaction via communication channels that conform to the particular communication protocol. The maximum size of a data frame is generally referred to as the maximum transmission unit (MTU) size. For example, the MTU size for a data frame transmitted via a communication channel conforming to the 802.15.4 standard is typically 102 bytes. The MTU for a data frame transmitted via a communication channel conforming to the 802.11 standard is typically 2272 bytes. The MTU for a data frame via a communication channel conforming to the 802.3 standard is 1500 bytes.

Separately, a network routing protocol standard may also define an MTU size for data frames packaged according to the network routing protocol. For example, the IPv6 standard defines the MTU of a data frame as typically being 1280 bytes. Thus, in some scenarios, it may not be possible to transmit an IPv6 data frame via communication channels conforming to the 802.15.4 standard in a single transaction. In these scenarios, an IPv6 data frame may be fragmented into several data frames before the IPv6 data frame is transmitted via communication channels conforming to the 802.15.4 standard. The data frame fragments may be encapsulated with information which allows for the reassembly of the data frame fragments at a receiving device and may be reassembled at the computing device which is the intended recipient of the IPv6 data frame. Fragmentation and reassembly may be performed by utilizing a protocol such as 6LoWPAN. As a consequence of fragmenting, some or all of the IPv6 data fragments may not include an IP header.

In examples described below, the fragments of an IPv6 data frame may be encapsulated with header information corresponding to a second network routing protocol, the WirelessHART network routing protocol for example, to facilitate the routing of IPv6 data frames between computing devices that are configured to process data frames conforming to the WirelessHART protocol. In some examples, as noted above, the WirelessHART network protocol header may include a flag indicating that the data frame is an IPv6 data frame. Here, the computing device may be configured to receive and transmit IPv6 data frame fragments encapsulated with WirelessHART network protocol information and non-IPv6 data frames encapsulated with WirelessHART network protocol information.

Generally speaking, the communication technique described herein, in one case, entails creating a data frame of a first type, i.e., using a first network protocol such as an IP protocol, and sending that data frame over a network the using network routing according to the first network protocol to a second device that is connected to a second communication network that uses a second and different network routing protocol, such as a non-IP protocol. The second device encapsulates the data frame with the first network routing information therein in a data frame having network routing information defined by the second network routing protocol and sends or routes the data frame over the second communication network using the second network routing protocol to a third device which then decodes the received data frame to produce the data frame of the first type (e.g., an IP data frame). A flow chart 200 of FIG. 4A illustrates this method in more detail and includes a number of steps taken in or performed by different devices in the various communication networks over which communications occur.

Figure 4A:
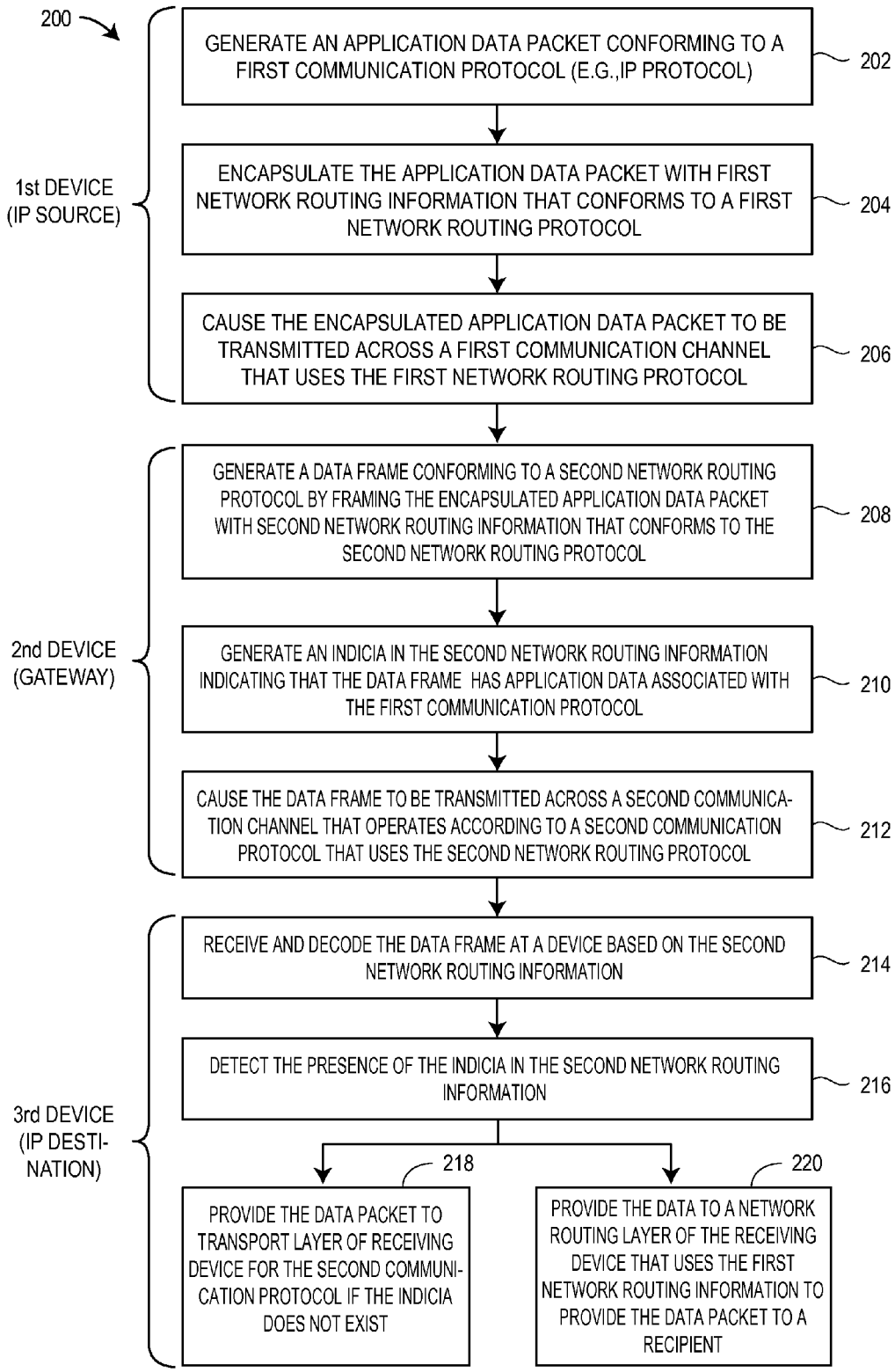
FIG. 4A is a flow chart of a communication method that may be used to generate an IP data frame in a first network using a first IP network routing protocol and to send this data frame to a device in a second network using a non-IP network routing protocol such as a mesh network routing protocol or an implicit destination or addressing routing protocol.

In particular, blocks 202, 204 and 206 of the flow chart 200 of FIG. 4A are performed in a first device connected to a first communication network that uses a first network routing protocol, such as an IP network routing protocol (e.g., IPv6). The blocks 208, 210 and 212 are performed in a second device, such as a gateway device, located at a junction between the first communication network and a second communication network that uses a second network routing protocol, such as a WirelessHART communication network, that is different than the first network routing protocol. (Here, it will be noted that the WirelessHART communication network is a specialized mesh network that is typically used in the process control industry to implement communications in process plants and other types of manufacturing plants. Generally speaking, the WirelessHART network protocol calls for various other types of information, such as process control or process system commands to be placed into the network routing information of a data packet to enable better routing within the process control network. Such commands are not supported by IP network routing protocols.) The blocks 214, 216, 218 and 220 are performed in a receiving device connected to the second communication network which is the device that is to receive the original data packet developed by the first device on the first communication network.

In particular, at the block 202, an application within the first device on the first communication network (e.g., an IP based communication network) generates an application data packet or message in a manner that is consistent with routing that message over a communication network using a first network routing protocol (assumed for this example to be an IP protocol such as an IPv6 protocol). The block 204 operates to encapsulate the application message (as processed by a presentation layer, a session layer and a transport layer of a stack, if so desired), with first network routing information that conforms to the first network routing protocol. In this example, the output of the block 204 may be a standard IPv6 data packet ready for transmission over an IP network, such as the internet. Next, a block 206 causes the encapsulated application data packet to be transmitted across the first communication network or channel that uses the first network routing protocol, e.g., using IP address routing. Of course, the block 206 may process the data packet at the data link and physical layers of the communication stack prior to sending the IPv6 data packet over the first communication network.

Next, a block 208 within, for example, a gateway device connecting the first communication network to the second communication network, receives and decodes the data frame and recognizes that the IP address within the first network routing information of the data frame is for or is associated with a device on the second communication network. The block 208 within the gateway device then generates a data frame conforming to a second network routing protocol used by the second communication network by framing the received data packet (including the network routing information for the first network routing protocol) with second network routing information that conforms to the second network routing protocol and that is configured to route the data packet to the device located on the second communication network that is associated with the IP address within the original IPv6 data packet. If needed or desired, the block 208 may operate to fragment the received IPv6 data packet using, for example, 6LoWPAN fragmenting techniques to create a number of data packets from the received IPv6 data packet prior to placing the second network routing information on each of those created data packets (or data packet fragments).

A block 210 additionally generates an indicia, such as by setting a flag in the second network routing information of the data packets, indicating that the underlying data frame within the packets being created have application data associated with the first network routing protocol. A block 212 within the gateway device then causes the data frame to be transmitted across the second communication network or a channel on the second communication network that operates according to the second network routing protocol using the second network routing protocol information within the data packets.

A block 214 at the receiving device, i.e., the device associated with the IP address of the original data frame but located on the second communication network, receives and decodes the data frame at the physical, data link and network layers of the stack based on the second network routing information of the data frame. A block 216 within this device operates to detect the presence or absence of the indicia or flag in the second network routing information of the received data packet. If such a flag does not exist, or if the flag indicates the underlying data packet was originally created as a data packet associated with the second network routing protocol, the block 218 provides the data packet to a transport layer of stack of the receiving device associated with the second network communication protocol for processing. However, if the indicia does exist, or if the flag indicates that the underlying data packet was originally created as a data packet associated with the first network routing protocol (e.g., an IP protocol), the block 220 provides the data to a network layer of the stack of the receiving device that uses the first network routing information to decode and process the packet. This network layer of the stack may first defragment a series of such received packets to reassemble the original IPv6 data packet, and may then process the IPv6 data packet using standard IP network layer and transport layer processing so that the IPv6 data packet may be delivered to an application or application layer in the stack of the receiving device as if it was sent to the receiving device using an IP network routing protocol.

In a similar manner, the communication technique described herein can entail creating a data frame of a first type, i.e., using a first network protocol associated with a first communication network, such as an IP protocol, and first sending that data frame over a second network that uses a second network routing protocol (different from the first network routing protocol) to a second device that is also connected the first communication network. In this case, the first device encapsulates the date frame having the first network routing protocol information therein with second network routing information and sends or routes the data frame over the second communication network using the second network routing protocol to the second device. The second device then decodes the received data frame using the second network routing protocol to produce a data frame of the first type (e.g., an IP data frame) and then sends the decoded data frame over the first communication network using the first network routing protocol. A flow chart 250 of FIG. 4B illustrates this method in more detail as including a number of steps taken in or performed by different devices in the various communication networks over which communications occur.

Figure 4B:
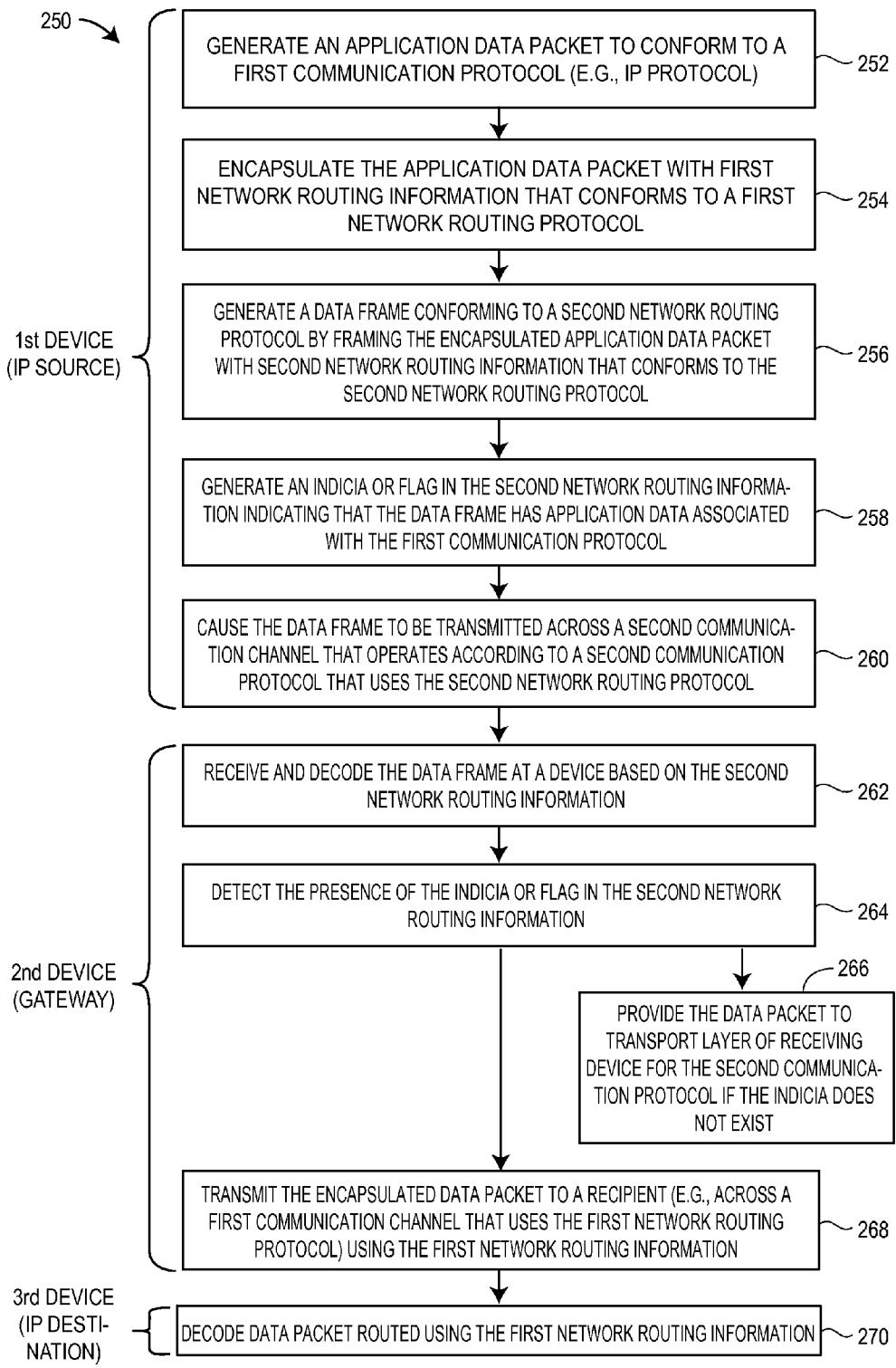
FIG. 4B is a flow chart of a communication method that may be used to generate an IP data frame in a network using a non-IP network routing protocol such as a mesh network routing protocol or an implicit destination or addressing routing protocol and to send this data frame to a device in a network that uses an IP network routing protocol or an explicit destination or addressing routing protocol.

In particular, blocks 252, 254, 256, 258 and 260 of the flow chart 250 of FIG. 4B are performed in a first device connected to a second communication network that uses a second network routing protocol, such as a WirelessHART network routing protocol. The blocks 262, 264 and 268 are performed in a second device, such as a gateway device, located at a junction between the first communication network (e.g., an IP based communication network) and the second communication network that uses the second network routing protocol. The block 270 may be performed in a receiving device connected to the first communication network which is the device that is to receive the original data packet developed by the first device on the second communication network.

In particular, the block 252 is performed within an IP-enabled device on the second communication network (e.g., an IP-enabled WirelessHART device) and generates an application data packet assuming that the data packet will be sent over a communication network that conforms to the first communication protocol (e.g., a data packet conforming to an IP network protocol). The application that generates this data packet may therefore be sockets based application. As noted above with respect to FIG. 4A, the IP address used in this data packet may be first obtained by communicating with a gateway device on, for example, a WirelessHART communication network that is connected to the IP network, and having the gateway device perform DNS services (e.g., act as a DNS server) to determine the correct IP address for a domain name provided by the WirelessHART device. A block 254 of the IP-enabled device encapsulates the application message (after being processed by the appropriate presentation, session and transport layers of a stack within the IP-enable device) with first network routing information that conforms to the first network routing protocol by, for example, adding IP addressing information to the data message. Next, a block 256 generates a data frame conforming to a second network routing protocol by framing the application data packet from the block 254 with second network routing information that conforms to the second network routing protocol. In this case, the block 256 may fragment the data packet created by the block 254 to create a set of data packets that conform to the size allowed by the second communication network prior to adding the second network routing information to each of the fragmented data packets. A block 258 also generates or places an indicia within the second network routing information of each such data packet, indicating that the underlying data frame has application data associated with the first network routing protocol (e.g., IPv6 data packets). A block 260 then causes the data frames created by the block 256 and 258 to be transmitted across a channel of the second communication network that operates according to the second network routing protocol using the second network routing information within these packets.

A block 262 performed in, for example, a gateway device that is connected, at different inputs thereof, to both the second communication network and the first communication network, receives and decodes the data frames received via the second communication network based on the second network routing information within these data frames. The block 264 operates within this gateway device to detect the presence of the indicia or flag in the second network routing information of the received data frames indicating the presence of underlying IP data. If such a flag does not exist in a data packet, a block 266 may provide the data packet to the transport layer of receiving device that operates according to the second communication protocol to decode and process the data or may perform further routing on that data via the second communications network. However, if the flag does exist or is set, a block 268 retrieves the underlying IP data frame by, for example decoding and reassembling IP data frame information from multiple data packets received over the second communication network to produce the original IPv6 data packet including the IP network routing information within that original IPv6 data packet. The block 268 may then use the IP network routing information (e.g., the IP address information) within that reassembled IPv6 data packet to transmit the data packet to a recipient via a communication channel of the first communication network using the first network routing protocol. At a block 270, the receiving device (i.e., the device having the IP destination address of the IPv6 data packet as created by the first device) may receive and decode the IPv6 data packet in any known or standard manner.

As will be understood, these basic communication techniques can be used in various different scenarios to provide IP data messaging or communication (e.g., messaging of IP data frames such as IPv6 data frames) in or across communication networks, such as process plant communication networks, that do not use or support IP based routing for communications therein. A couple of these scenarios will be described below as examples only.

Figure 5:
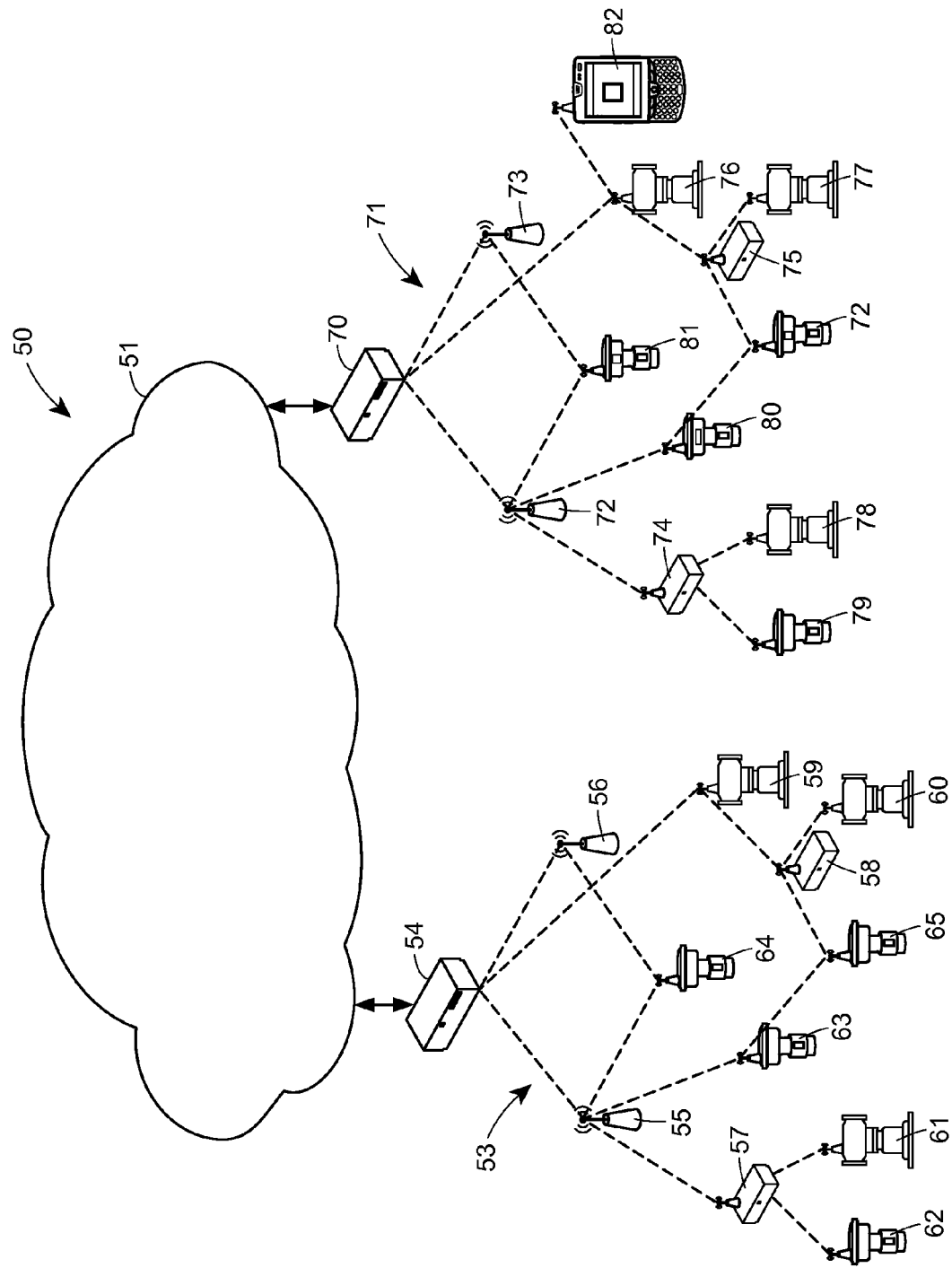
FIG. 5 illustrates an example WirelessHART network in which WirelessHART field devices may operate to receive and transmit IPv6 data frames within a WirelessHART network and between different WirelessHART networks using a communication network that supports or implements the IPv6 network routing protocol.

FIG. 5 illustrates an example communication network 50 in which field devices in a process plant implement the communication methods described herein to receive and transmit IPv6 data frames via the internet 51 and via one or more process control based communication networks 53 and 71, which may be WirelessHART communications networks that do not support IP network routing. In general, process control systems, like those used in chemical, petroleum or other process plants, include field devices, illustrated in FIG. 5 as field devices 59-65 and 76-81, which perform sensing and physical control functions within a process. Each of the field devices 59-65 and 76-81 may be, for example, a valve, a valve positioner, a switch, a sensor (e.g., temperature, pressure or flow rate sensor), a pump, a fan, a controller, an I/O device, etc. Field devices perform control and/or physical functions within a process or process control loop such as opening or closing valves and taking measurements of process parameters. In the wireless communication networks 53 and 71, the field devices 59-65 and 76-81 are producers and consumers of data frames, such as WirelessHART data frames and IPv6 data frames. Devices within the networks 53 and 71 which are capable of creating, receiving and using IPv6 data frames will be referred to herein as IP-enabled devices.

Generally, within the WirelessHART networks 53 and 71, computing devices utilize the WirelessHART network routing techniques to route data frames to computing devices that are the intended recipients of the data frames. The field devices may, as is typical, create and transmit typical WirelessHART data frames over the WirelessHART networks 53 and 71. However, as will be understood from the discussion above, the data frames may also include IPv6 data frame fragments encapsulated with WirelessHART network routing information, or may include non-IPv6 data frame fragments encapsulated with WirelessHART network routing information. In this context, an IPv6-enabled WirelessHART gateway 54, for example, may perform the steps of fragmenting IPv6 data frames received from the internet 51 utilizing suitable protocols, 6LoWPAN for example, and encapsulating the data frame fragments with WirelessHART network protocol information that allows the data frame fragments to be routed within the WirelessHART network 53.

As illustrated in FIG. 5, the IPv6-enabled WirelessHART gateway 54 associated with the network 53 and an IPv6-enabled WirelessHART gateway 70 associated with the network 71 are connected to the internet 51. The IPv6-enabled WirelessHART gateways 54 and 70 may each be implemented as a standalone device, as a card insert-able into an expansion slot of workstations (not shown), as part of the I/O subsystem of a programmable logic controller (PLC) based system, or in any other manner. In addition to protocol and command conversion, the IPv6-enabled WirelessHART gateways 54 and 70 may provide synchronized clocking used by time slots and superframes (sets of communication time slots spaced equally in time) of the scheduling scheme of the WirelessHART communication networks 53 and 71, respectively.

Additionally, the WirelessHART communication network 53 may include router devices 57 and 58. The router device 57, for example, is a network device that forwards data frames from one wireless network device to another. A network device that is acting as a router device uses internal routing tables to decide which wireless network device is the next recipient of a particular data frame. Stand-alone routers such as the router 57 may not be required in those scenarios where all devices on the WirelessHART communication network 53 support routing. However, it may be beneficial (e.g., to extend the network, or to save the power of a field device in the network) to have dedicated routers, such as the routing 57, within the WirelessHART communication network 53.

The WirelessHART communication network 53 is also illustrated as including IPv6-enabled WirelessHART field devices 62, 63, 64 and 65. The IPv6-enabled WirelessHART field device 62, for example, may be capable of receiving and processing 6LoWPAN IPv6 data frame fragments encapsulated within WirelessHART network routing protocol information and may be capable of creating and routing 6LoWPAN IPv6 data frame fragments encapsulated within WirelessHART network routing protocol information. Similarly, the IPv6-enabled WirelessHART field device 62, for example, may be capable of routing non-IPv6 data frames encapsulated with a WirelessHART protocol header to another WirelessHART field device. To perform the routing, the WirelessHART field device 62, for example, utilizes the routing information in the WirelessHART network routing header that encapsulates a particular data frame.

The WirelessHART communication network 53 may also include traditional WirelessHART field devices 59, 60 and 61. The WirelessHART field device 59, 60 and 61 are capable of receiving and transmitting data frames encapsulated with WirelessHART network protocol information. The WirelessHART field devices 59, 60 and 61 may also be capable of routing 6LoWPAN IPv6 data frame fragments encapsulated within a WirelessHART network protocol header to an IPv6-enabled WirelessHART field device that is the intended recipient of the data frame fragments. To perform the routing, the WirelessHART field device 59, for example, utilizes the routing information in the WirelessHART network routing protocol header that encapsulates a 6LoWPAN IPv6 data frame fragment to perform routing. While the WirelessHART enabled field devices 59, 60 and 61 are capable of routing WirelessHART messages or data frames, including such data frames which include IPv6 data frames therein, these devices are not capable of decoding or using the IPv6 data frames themselves.

A router 58 in the WirelessHART network 53 may be capable of receiving data frames encapsulated with a WirelessHART network protocol header from the field device 59, for example. The router 58 may route the data frame to an adjacent field device 60, for example, based on the routing information in the WirelessHART network protocol header.

In the example system of FIG. 5, the WirelessHART communication network 71 includes the IPv6-enabled WirelessHART gateway device 70, one or more router devices 74 and 75, several IPv6-enabled field devices 79, 80, 81, and 82, and several traditional WirelessHART field devices 76, 77 and 78. The above mentioned devices may transmit and receive data frames via communication channels that conform to the 802.15.4 standard. In this case, the computing device 82 within the WirelessHART communication network 71 may be a handheld computing device. The computing device 82 may be provided with an adapter that is capable of transmitting and receiving data frames within the WirelessHART communication network 71 via communication channels that conform to the 802.15.4 standard. Additionally, the computing device 82 may receive and transmit IPv6 data frame fragments encapsulated within WirelessHART network protocol information and non-IPv6 data frames encapsulated within WirelessHART network protocol information from an IPv6 enabled field device 82. If desired, the computing device 82 may receive and transmit non-IPv6 data frames encapsulated within WirelessHART network protocol information from a non-IPv6 enabled field device 81. In each of these examples, the routing information in the WirelessHART network protocol header encapsulating the data frames is utilized by intermediate IPv6 enabled WirelessHART devices and non-IPv6-enabled WirelessHART devices to route the data frame within the WirelessHART network 71 to the device that is the intended recipient of the data frame based on the WirelessHART networking routing information of the data frame.

In one scenario described herein, two IPv6 enabled WirelessHART devices in the different WirelessHART networks 53 and 71 may also communicate with each other using IPv6 data frames that are sent over each of the networks 53 and 71 and that are sent between the networks 53 and 71 via the internet 51. As an example, the computing device 82 within the network 71 may communicate with an IPv6 enabled field device 63, for example, located in the other WirelessHART network 53 by transmitting and receiving IPv6 data frames which are sent across these networks and over the internet 51. In this scenario, an application, such as a web browser, executing in a computing device 82 may generate an IPv6 data frame. As an example only, the data in the data frame may correspond to a request for web page data from the IPv6 enabled field device 63. The computing device 82 may utilize a TCP/IP network protocol stack to generate one or more IPv6 data frames corresponding to the web page request.

Again, as noted above, the computing device 82 may determine the IP address or addresses to use to generate the IPv6 data frames (e.g. associated with the device or host for the device 63) by first communicating through the WirelessHART network 71 to the gateway device 71 using standard WirelessHART messaging. In this case, the device 82 may send a message having the name, such as a domain name of a website or other host to be reached in the device 63, and request the gateway device 71 to implement DNS services (or to act as or contact a DNS server on the internet 51) to resolve the domain name to an IP address. The gateway device 70 may then return this IP address to the device 82 to enable the device 82 to create the IPv6 data packet (for example) with the correct IPv6 destination address therein. While, the device 82 could use standard WirelessHART messaging to request the IP address DNS services from the gateway device 72, the device 82 could also use IPv6 data packets addressed to the gateway device 70 to request the IP address for another network entity using the communication techniques described herein (i.e., by encapsulating such an IP data frame in WirelessHART network routing information and sending the encapsulated data frame to the gateway device 70 for processing and decoding by an IP or sockets based application within the gateway device 70). Likewise, the gateway device 70 could return the determined IP address over the WirelessHART network 71 via an IP data message encapsulated in WirelessHART network routing information or via standard WirelessHART messaging.

Once created, the IPv6 data frames may then be fragmented by a 6LoWPAN protocol stack and the one or more fragments may be encapsulated within WirelessHART network routing information which is designed to send the data frame to the IPv6 enabled WirelessHART gateway 70 in the manner described with respect to the flow chart 40 of FIG. 3. The computing device 82 may then transmit the data fragments to the IPv6 enabled WirelessHART gateway 70 via 802.15.4 compliant communication channels within the WirelessHART network 71 using WirelessHART network routing. The data frame fragments may be received by the IPv6 enabled WirelessHART gateway 70 and the IPv6 enabled WirelessHART gateway 70 may reassemble the several data frame fragments to generate the IPv6 data frame corresponding to the web page request.

The IPv6 enabled WirelessHART gateway 70 may then utilize the destination IP address information available in the IPv6 header of the reassembled IPv6 data frame to route the IPv6 data frame to an IPv6-enabled WirelessHART gateway 54 via the internet 51. In this case, the destination IP address of the IPv6 data packet corresponds to the IPv6 address of IPv6 enabled field device 63 and the gateway 54 will store a list of the IP addresses of the devices within the network 53. Of course, the IPv6 enabled WirelessHART gateway 70 may utilize typical or available TCP/IP routing protocols to determine an appropriate route to the IPv6 enabled WirelessHART gateway 54 via the internet.

The IPv6 enabled WirelessHART gateway 54 may then use the method of the later part of the flow chart 40 of FIG. 3 to send the IPv6 data frame over the network 53 to the IP-enabled field device 63. In particular, the gateway 54 may fragment the received IPv6 data frame into one or more 6LoWPAN data frame fragments and may then encapsulate the data frame fragments within WirelessHART network routing protocol information before transmitting the data frame fragments over the WirelessHART network 53 in a manner addressed to or to be routed to the device 63 within that network. The WirelessHART network routing protocol information includes WirelessHART routing information which enables intermediate WirelessHART devices 59, 58 and 65, for example, to route the IPv6 data frame fragments (encapsulated within WirelessHART network routing information) to the IPv6 enabled WirelessHART field device 63.

The IPv6 enabled WirelessHART field device 63 may receive the several data fragments (encapsulated in WirelessHART network routing information) in several WirelessHART data packets via the WirelessHART communication network 53 and decode the data fragments using the WirelessHART network routing information to determine that the data frames are intended for the device 63. In that case, the device reassembles the several data frame fragments from different data packets to generate the IPv6 data frame corresponding to the web page request transmitted by computing device 82, and provides this request to the application to which the IPv6 data frame was originally sent. The device may use the IP address information in the IPv6 data packet to determine the proper destination within the device 63. The IPv6 enabled WirelessHART field device 63 may then transmit hyper text markup language (html) IPv6 data frames corresponding to web page data back to the requesting device 82 for example using the same methodology, i.e., by creating and sending these IPv6 data packets via the WirelessHART network 53, the internet 51 and the WirelessHART network 71. In particular, by implementing similar steps as those detailed above, the html IPv6 data frames may sent to and received by the computing device 82 via one or more WirelessHART field devices in the network 53, the IPv6 enabled WirelessHART gateway 54, the internet 51, the IPv6 enabled WirelessHART gateway 70 and one or more WirelessHART field devices in the network 71.

The computing device 82 may also communicate with one or more other communication networks by utilizing suitable communication protocols. For example, referring to FIG. 1, the computing device 82 may communicate with a cellular network 15 via the gateway device 70. In another scenario, the computing device 82 may communicate with a WLAN network 16 via the gateway device 70. Still further, IP messages or data packets may be created by a first IP-enabled field device within one of the WirelessHART networks 53 or 71 and sent to another IP-enabled field device within the same WirelessHART network 53 or 71 using the communication techniques described herein, to thereby enable IP messaging between two devices on a non-IP communication network. In this case, as will be understood, the IP data messages created by the first IP-enabled field device will be encoded with WirelessHART network routing information to be used to send that data over the WirelessHART communication network 53 or 71 in the manners described above. In this case, however, the messages still may need to go through one of the gateway devices 54 or 70, because these devices store links or routing tables defining associations between IP addresses for devices within the appropriate WirelessHART network 53 or 71 and the WirelessHART network routing information for those devices. In another case, however, the IP-enabled devices themselves may store IP addresses and routing tables for intra-network communications, and may use these IP routing tables to determine the WirelessHART network routing information needed to be placed into a header of a data packet for routing within the WirelessHART network.

Figure 6:
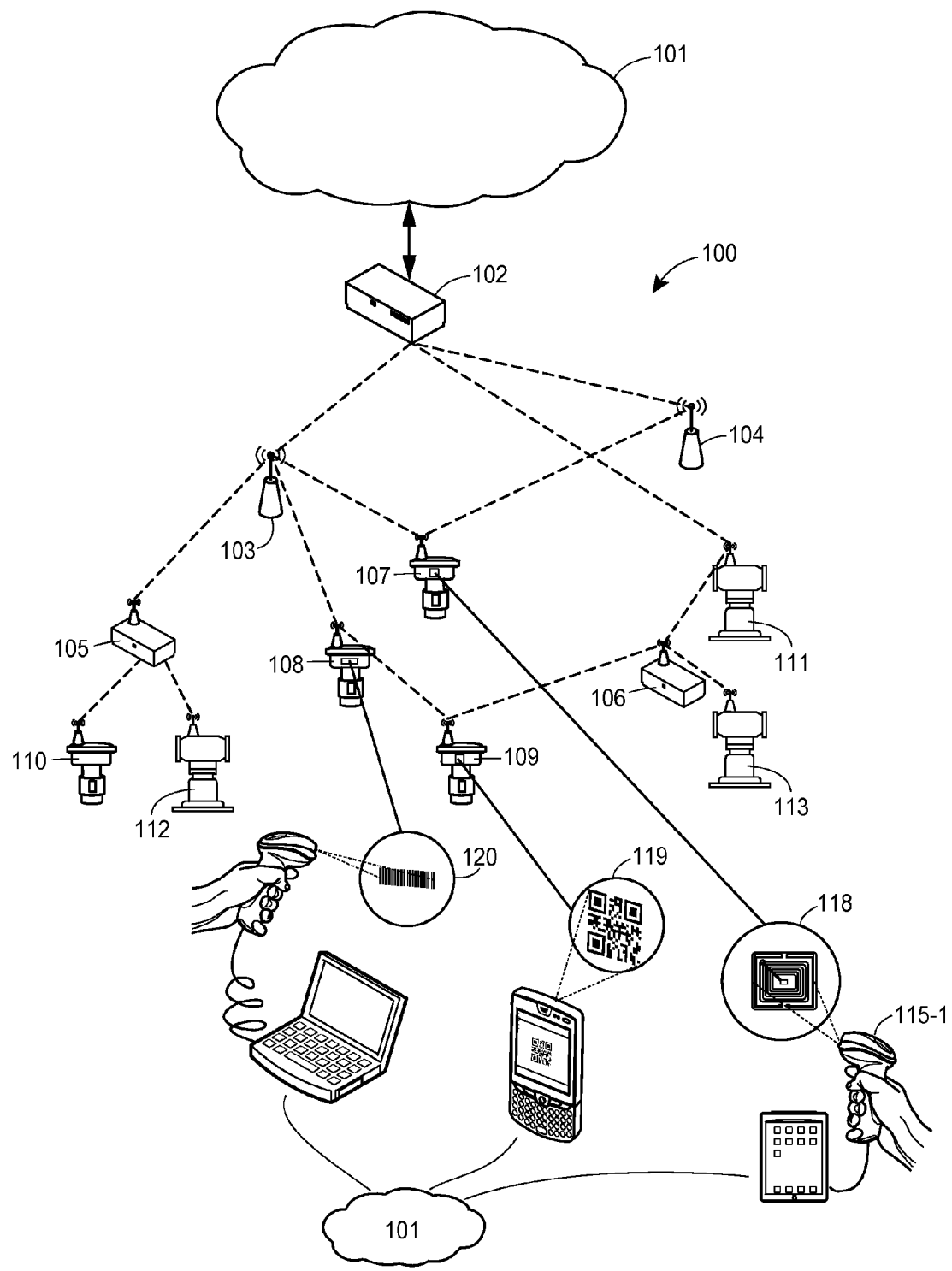
FIG. 6 illustrates another example WirelessHART network via which remotely connected computing devices may communicate with WirelessHART field devices utilizing IPv6 data frames.

FIG. 6 illustrates another example WirelessHART communication network 100 in which WirelessHART field devices operating according to the WirelessHART communications protocol may operate to receive and transmit IPv6 data frames via the internet 101 from and to computing devices 115, 116 and 117. The computing devices 115, 116 and 117 may be communicatively coupled to the internet 101 via non-WirelessHART networks, such as networks which implement WLAN, GSM, CDMA, Bluetooth, ZIGBEE, etc. protocols.

The WirelessHART communication network 100 includes an IPv6 enabled WirelessHART gateway 102, several WirelessHART routers 105 and 106, several IPv6 enabled WirelessHART field devices 107, 108, 109 and 110 and several non-IPv6 enabled WirelessHART field devices 111, 112 and 113. As illustrated in FIG. 6, the IPv6 enabled WirelessHART gateway 102 is communicatively coupled to the internet 101 and to several field devices 103, 104 and 111 within the network 100.

In one example, the computing device 115 receives and transmits IPv6 data frames to and from an IPv6 enabled WirelessHART device 107 using both the internet 101 and the structure of the WirelessHART network 100. The computing device 115 may be communicatively coupled to the internet 101 via a WLAN network 16 as depicted in FIG. 1 for example. In this example, however, the computing device 115 will be assumed to have only IPv6 enabled communication capabilities and will not be able to communicate directly in the WirelessHART network 100. However, the computing device 115 may include a suitable near field communication (NFC) scanner such as a radio frequency identification (RFID) scanner 115-1. The IPv6 enabled WirelessHART field device 107 may be provided with an RFID tag 118 and this tag may store an identification code or an ID (e.g., an IP address) that corresponds to the identity of the IPv6-enabled WirelessHART field device 107. A user within the plant may, for example, scan the RFID tag on the device 107 via the RFID scanner 115-1 into the computing device 115. Information on the RFID tag may correspond to an IPv6 address, a web URL, or other data which may be associated with the IPv6-enabled WirelessHART field device 107. In another scenario, the computing device 115 may query a remote database with the information received from the RFID tag 118 to receive an IPv6 address or a web URL for the IPv6-enabled WirelessHART field device 107 to enable the computing device 115 to communicate with the field device 107.

An application executing on the computing device 115, such as a web browser, may generate an IPv6 data frame corresponding to a request for web page data, for example, to be transmitted to the IPv6-enabled WirelessHART field device 107 using the IP address of the field device 107. As such, the destination IP address in the IP header of the IPv6 data frame may correspond to the IPv6 address of IPv6-enabled WirelessHART field device 107. The computing device 115 may transmit the IPv6 data frame via a WLAN network 16, for example, into the internet 101. The IPv6 data frame may ultimately be routed to and received by the IPv6 enabled WirelessHART gateway 102 via the internet 101 using standard IPv6 or IP network routing protocol techniques. As previously described, the IPv6 enabled WirelessHART gateway 102 may use IP routing tables to determine that the device associated with the IP destination address of the IPv6 data frame is within the WirelessHART network 100 and may determine WirelessHART network routing information needed to send information to that device over the network 100. The IPv6 enabled WirelessHART gateway 102 may then fragment the received IPv6 data frame and encode each of the data frame fragments with the WirelessHART network routing information needed to route those data frames to the device 107 within the network 100. The gateway 102 may also encode this WirelessHART network routing information with a flag indicating that the underlying packet or information is from or is associated with an IPv6 data packet and may then send the encoded data frames to the field device 107 (or to an application or IP address associated with the field device 107) via the WirelessHART network 100 using WirelessHART network routing. In one example, the WirelessHART gateway 102 may fragment the IPv6 data frame according to the 6LoWPAN protocol and may then encapsulate the resulting data frame fragments in a WirelessHART network routing protocol header that includes WirelessHART addressing information for the IPv6 enabled WirelessHART field device 107, such as a graph ID. Of course, the WirelessHART gateway 102 transmits the WirelessHART encapsulated IPv6 data frame fragments into the WirelessHART network 100 via low power communication channels, such as communication channels operating according to the 802.15.4 standard.

In this example, the IPv6 enabled field device 107 receives the WirelessHART encapsulated IPv6 data frames via standard WirelessHART communications over the network 100. The IPv6 enabled field device 107 may, upon receiving the WirelessHART encapsulated packets, reassemble the several data frame fragments to generate an IPv6 data frame that corresponds to the IPv6 data frame transmitted by the computing device 115 and provide this data frame to an application within the field device 107 to which the packet was addressed. The IPv6 enabled field device 107 may then generate IPv6 data frames that include information requested by the computing device 115 and send these IPv6 data frames to the computing device 115 using the techniques described herein. As previously described the IPv6 data frames created at the field device 107 may be fragmented and the fragments may be encapsulated with WirelessHART network layer protocol headers within the field device 107. The IPv6 enabled field device 107 may then transmit the data frame fragments via the WirelessHART network 100 to the WirelessHART gateway device 102 for sending to the device 115 via the internet 101. The IPv6 enabled WirelessHART gateway 102 may reassemble the received data frame fragments to generate the IPv6 data frames corresponding to the IPv6 data frames generated by the IPv6 enabled field device 107. The IPv6 enabled WirelessHART gateway 102 then transmits the IPv6 data frames to the IP address of the device 115 via the internet 101 using the IP address of the IPv6 data frames. The computing device 115 may receive the IPv6 data frames via the WLAN network 16, for example, and may decode and display the information in the IPv6 data frames in a web browser, for example to the user. Thus, in this example, the device 115, which has no WirelessHART communication capabilities, may use the communication techniques described herein to communicate IPv6 data packets directly with a field device 107 on a WirelessHART network in which communications between devices must occur using the WirelessHART communications protocol (which does not support IPv6 data frame routing). This technique thus enables applications running in devices outside of the WirelessHART network 100 to communicate with devices within the WirelessHART network using IP based communications, even though the WirelessHART communication network does not support IP based communications. This technique also enables the use of applications running in devices within of the WirelessHART network 100 to communicate with devices outside of the WirelessHART network using IP based communications or socket based applications even though the WirelessHART communication network does not inherently support IP based communications. These advantages thus enable standard IP enabled applications (which are very prevalent and known) to be used within and to communicate with devices in specialized communications networks, such as the WirelessHART network, which does not use IP based communications. These techniques thus, in turn, enable standard IP based communications to occur across the WirelessHART communication network or other communications networks that do not support or use IP based network routing or that do not support IP addressing.

In another example, a QR reader 116 may read information from a QR code 119 affixed to an IPv6 enabled WirelessHART field device 109. The information may include, for example, the IPv6 address for communicating with the IPv6 enabled WirelessHART field device 109 using IP based communications. The QR reader 116 may be communicatively coupled to the internet 101 via a wired or wireless network and may utilize the information read from the QR code 119 to transmit and receive IPv6 data frames to and from IPv6 enabled WirelessHART field device 109 via the internet 101 in the same manner as described with respect to the device 115. In another example, a bar code reader 117 may read the bar code 120 affixed to an IPv6 enabled WirelessHART field device 120. The bar code reader 117 may utilize the information encoded in the bar code 120 to transmit and receive IPv6 data frames to and from IPv6 enabled WirelessHART field device 109 via the internet 101. Of course, many other types of applications may be used to communicate with IPv6 enabled field devices within the network 100 to obtain information from these devices and to send information to these devices (such as commands, instructions, request for data, etc.) Thus, in one case, an operator or technician may use IP based applications within devices connected to the internet to communicate with field devices within a WirelessHART or other network that does not use IP based network routing so as to obtain information of any type from these devices or to send information of any nature to these devices.

Figure 7:
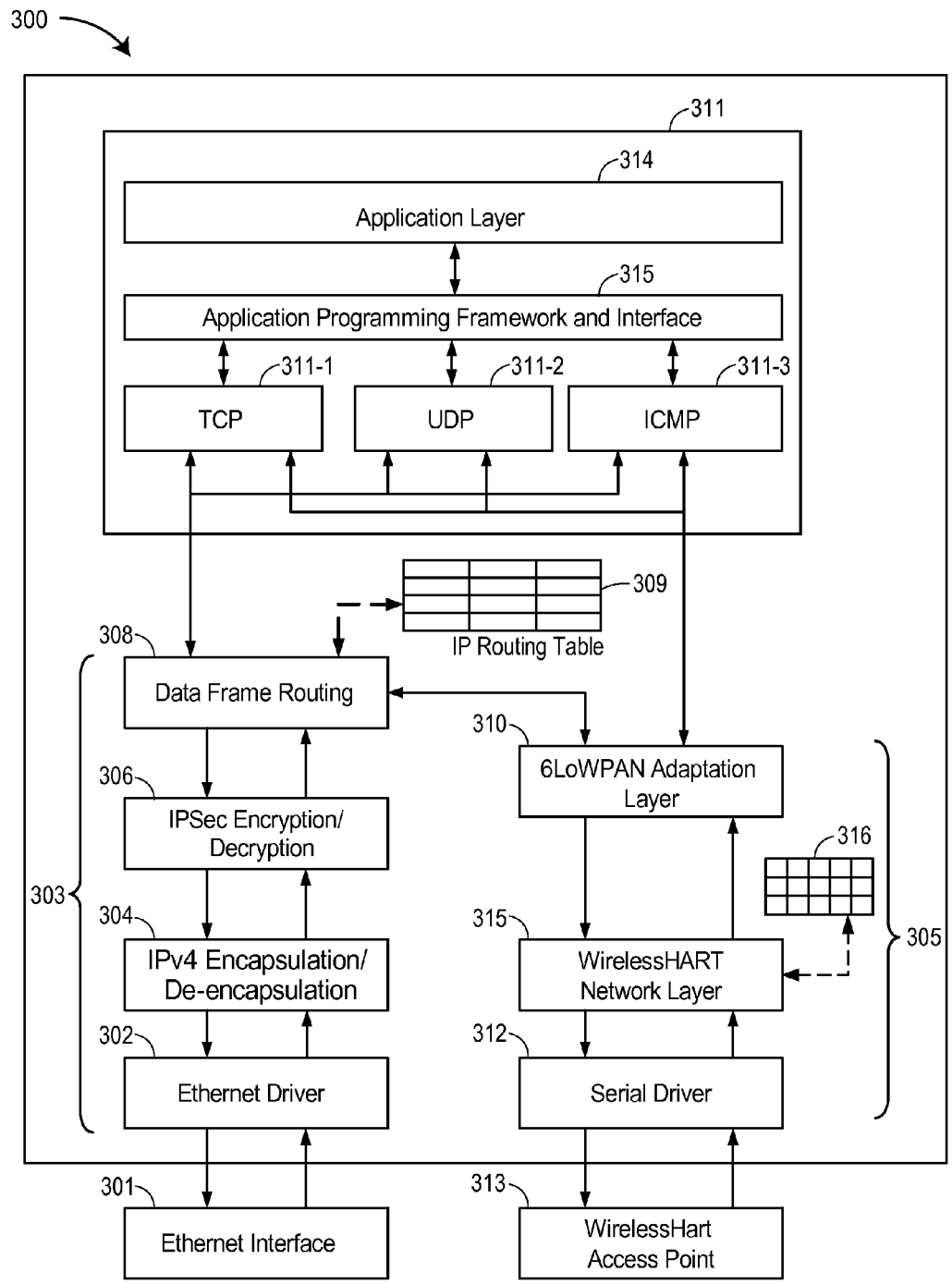
FIG. 7 is a block diagram of an example network protocol stack that may be used in a gateway device to receive and transmit IPv6 data frames from, for example, the internet while simultaneously supporting routing of IPv6 data frames on a non-IP communication network.

FIG. 7 is a block diagram of an example network protocol stack 300 that may be used to implement portions of the communication techniques described herein to receive and transmit IPv6 data frames from and to the internet on the one hand, and to route IPv6 data packets via a WirelessHART network on the other hand. In this case, the communication protocol stack 300 may be implemented in the IPv6-enabled WirelessHART gateway 11*a* of FIG. 1 or in either of the gateway devices 54 or 70 of FIG. 5 or in the gateway device 102 of FIG. 6, for example. The device that implements the stack 300 may be a general purpose computer or alternatively may be a special-purpose embedded computing device associated with, for example, a field device (which may be a process controller) or process control network. The several functional blocks which comprise the communication protocol stack 300 may be implemented using software instructions, hardware, firmware, ASICs, etc. In the case in which software instructions are used, the software instructions may include several blocks that may be executed by a hardware microprocessor and these blocks may be communicatively and programmatically coupled with one another via software messaging queues, software callbacks, memory buffers, buses, etc. The software blocks may use several hardware resources such as timers, hardware interrupts, fast ethernet controllers, serial communication controllers, etc. to receive and transmit IPv6 data frames. Although not shown in FIG. 7, the communication protocol stack 300 may programmatically interface with a real-time operating system (RTOS). Examples of RTOS's include, PSOS, UCOS, RTLinux, etc. As noted above, some or all of the several functional blocks which make up the communication protocol stack 300 may be implemented in an application specific integrated circuit (ASIC) or in a field programmable gate array (FPGA) device or other hardware/firmware devices if so desired.

In the system of FIG. 7, the stack 300 generally includes a first branch 303 and a second branch 305. The first branch is generally associated with receiving and decoding, or encoding and transmitting IP data frames, such as IPv6 data frames via an ethernet interface 301 using an IP network routing compliant communication network. The second branch 305 is generally associated with receiving and decoding, or encoding and transmitting IPv6 data packets or other type so packets over a non IP-network routing compliant communication system, such as a WirelessHART communication network via a WirelessHART access point 313. The branches 303 and 305 are connected to one another and to upper layers of the stack (such as the transport and layers of the stack 300) which generally rely on or use IPv6 data frame communications.

More particularly, the first branch 303 of the communication protocol stack 300 includes an ethernet driver 302 that connects to the ethernet interface 301 which, in this case, may include a single physical interface. In other cases, the ethernet interface 301 may include two or more physical interfaces. IPv4, IPv6 and IPv4-encapsulated IPv6 data frames may be received (ingress) and transmitted (egress) from and to the internet via the ethernet interface 301 and thus implements a physical layer stack element and/or a data link layer stack element. In this example, the ethernet interface 301 is adapted to operate according to the IEEE 802.3 standard. However, the ethernet interface 301 may operate according to any other of number of synchronous, asynchronous and/or isochronous serial communication standards, and the ethernet driver 302 may also configure the ethernet interface 301 as needed. Of course, as is typical, the ethernet driver 302 receives and verifies the integrity of the data frames received via the ethernet interface 301 and the ethernet driver 302 may store the received data frames in one or more memory buffers located in the device in which the stack 300 is operated. The ethernet driver 302 may alert an IPv4 encapsulation/de-encapsulation block 304 when a data frame is received via the ethernet interface 301 and/or when a data frame is stored in the memory buffers and the ethernet driver 302 may provide the IPv4 encapsulation/de-encapsulation block 304 with an indication corresponding to the location of the received data frame in the memory buffers. The ethernet driver 302 may also transmit, via the ethernet interface 301, data frames received from the IPv4 de-capsulation/encapsulation block 304.

The IPv4 encapsulation/de-encapsulation block 304 operates to process the data frames received via the ethernet interface 301. The IPv4 encapsulation/de-encapsulation block 304 may determine if the data frame received is an IPv4 data frame, an IPv6 data frame or an IPv4-encapsulated IPv6 data frame. If desired, the IPv4 encapsulation/de-encapsulation block 304 may operate on an IPv4-encapsulated IPv6 data frame to generate an IPv6 data frame. The IPv4 encapsulation/de-encapsulation block 304 may also alert an IPSec encryption/decryption block 306 during or after the completion of the de-encapsulation of a received IPv4-encapsulated IPv6 data frame.

Of course, the IPv4 encapsulation/de-encapsulation block 304 may also receive data frames from the IPsec encryption/decryption block 306 and the IPv4 encapsulation/de-encapsulation block 304 may determine if a data frame received from the IPsec encryption/decryption block 306 is an IPv4 data frame or an IPv6 data frame. The IPv4 encapsulation/de-encapsulation block 304 may be configured to generate an IPv4-encapsulated IPv6 data frame from the IPv6 data frame received from the IPsec encryption/decryption block 306. The IPv4 encapsulation/de-encapsulation block 304 may operate such that it does not encapsulate an IPv4 data frame received from the IPsec encryption/decryption block 306. In any event, the IPv4 encapsulation/de-encapsulation block 304 provides the ethernet driver 302 with the IPv4-encapsulated IPv6 data frame or the IPv4 data frame. As previously described, the ethernet driver 302 may transmit via the ethernet interface 301 data frames received from the IPv4 de-capsulation/encapsulation block 304. In pure IPv6 networks, the IPv4 encapsulation/de-encapsulation block 304 may not be needed.

The IPSec encryption/decryption block 306 receives de-encapsulated IPv6 data frames and/or IPv4 data frames from the IPv4 encapsulation/de-encapsulation block 304. Upon doing so, the IPsec encryption/decryption block 306 determines if the data frame received is encrypted. If required, the IPsec encryption/decryption block 306 may decrypt the received data frame using one or more encryption/decryption algorithms. A partial list of common examples of encryption/decryption algorithms include Data Encryption standard (DES), Advanced Encryption standard (AES), etc. To perform encryption/decryption, the IPsec encryption/decryption block 306 may implement protocols (not shown) which enable the programming and exchange of encryption/decryption keys. When finished, the IPsec encryption/decryption block 306 provides a data frame routing block 308 with the decrypted data frame.

On the other hand, the IPsec encryption/decryption block 306 also receives data frames from the data frame routing block 308 and is configured to encrypt the data frames with a suitable encryption algorithm. In this case, the IPsec encryption/decryption block 306 provides the IPv4 encapsulation/de-encapsulation block 304 with either encrypted or non-encrypted data frames to be transmitted via the ethernet interface 301.

Generally, the data frame routing block 308 which may implement or include a network routing layer stack element receives data frames from one or more data frame providers. Based on the information in the received data frames, the data frame routing block 308 transmits the received data frames to the one or more intended recipients of the data frames, which recipients are either applications within the application layer of the stack 300 or applications in devices on the ethernet communication network and reachable via the stack branch 303, or devices on the WirelessHART network and reachable via the stack branch 305. Of course, an intended recipient of the data frames in one instance may also operate as a data frame provider in other instances. Generally speaking, the immediate data frame providers and data frame recipients in the stack of FIG. 7 include the IPsec encryption/decryption block 306, a 6LoWPAN adaption layer 310, and a transport layer stack 311 that uses, in this case, the TCP, UDP or ICMP transport protocol.

During operation, upon receiving data frames from the IPsec encryption/decryption block 306, the data frame routing block 308 examines the received data frames to determine the IP address of the intended recipient devices of the received data frames. The data frame routing block 308 may determine that the intended recipient of the data frame is the IP-enhanced gateway itself, in which case the data frame routing block 308 may alert the transport layer stack 311 with an indication that a data frame is available. Details of the transport layer stack 311 (which, if desired may also be part of or implement a network layer stack element in the stack 300) will be discussed in more detail later. Alternatively, the data frame routing block 308 may determine that the intended recipient device of the data frame is one or more IPv6-enabled WirelessHART devices located within a WirelessHART network connected to the IP-enable gateway device in which the data frame routing block 308 is located via the wireless access point 313. In this case, the data frame routing block 308 provides the data frame to the 6LoWPAN adaption layer 310. Still further, the data frame routing block 308 may determine that the intended recipient device of the data frame is one or more devices connected to the IP-enabled gateway device in which the data frame routing block 308 is located via the ethernet interface 301. In this case, the data frame routing block 308 provides the data frame to the IPSec Encryption/Decryption block 306.

The data frame routing block 308 may maintain one or several "routing tables" (illustrated in FIG. 7 as routing tables 309) to assist the data frame routing block 308 in determining where to route a particular data frame. Generally, the routing tables 309 include one or several route entries and each route entry may include a subnet mask, the IP address of another gateway or router, etc. The entries in the routing table 309 may be utilized by the data frame routing block 308 to determine the address or location of the next gateway/router where the data frame may be sent to, in order for the data frame to reach the intended recipient devices connected to the internet. The routing table entries maintained by the data frame routing block 308 in the IP routing tables 309 may be configurable and the routing tables 309 may be updated with route entries received from the internet or via the WirelessHART network in some cases.

The data frame routing block 308 may also receive IPv6 data frames from the 6LoWPAN adaption layer 310 and/or IPv6 data frames from the network layer stack 311 of the IP-enabled gateway. The data frame routing block 308 may determine the IP address of the intended recipient devices of the received IPv6 data frames and, based on the information in the routing table 309, the data frame routing block 308 may associate the IPv6 data frame with an appropriate route entry. The data frame routing block 308 may then transmit the IPv6 data frame to the IPsec encryption/decryption block 306 with the associated route entry or may send the IPv6 data frame to the second branch 305 for processing and sending over the WirelessHART network if the IP address of the IPv6 packet is associated with a device in the WirelessHART network.

Generally speaking, to send an IPv6 data packet over the WirelessHART network, the 6LoWPAN adaption layer 310 receives IPv6 data frames from the data frame routing block 308 when the data frame routing block 308 determines that a data frame needs to be sent to a device within or to an IP address associated with a device in the WirelessHART network to which the IP-enabled gateway device is connected. In this case, the 6LoWPAN adaption layer 310 performs data frame fragmenting to generate one or more 6LoWPAN data frames from the IPv6 data frame received from the data frame routing block 308 and, in doing so, the 6LoWPAN adaption layer 310 may associate each of the generated 6LoWPAN data frames with the IPv6 address of the intended recipient of the IPv6 data frame. Of course, the IPv6 address of the intended recipient of the IPv6 data frame may be retrieved from IPv6 data frame itself.

However, as illustrated in FIG. 7, the 6LoWPAN adaption layer 310 may also receive IPv6 data frames directly from the transport layer stack element 311 (which may also implement, at least partially, a network layer stack element for the IP network) within the gateway device implementing the stack 300 to be delivered to a device on or connected to the WirelessHART network. In this case, the 6LoWPAN adaption layer 310 operates to generate one or more 6LoWPAN data frames from the IPv6 data frame received from the transport layer stack 311. Generally speaking, when the 6LoWPAN adaption layer 310 receives IPv6 data frames from the data frame routing block 308 and/or from the stack 311, the 6LoWPAN adaption layer 310 generates one or more 6LoWPAN data frames for each IPv6 data frame that is received. The 6LoWPAN adaption layer 310 then transmits the one or more 6LoWPAN data frames to a WirelessHART network layer 315 (which is a network layer stack element for the WirelessHART communication network) in the branch 305. As part of this communication, the WirelessHART network layer 315 may receive the IPv6 address of the intended recipient of the one or more 6LoWPAN data frames created by the 6LoWPAN adaption block 310 or the WirelessHART network layer 315 may determine such IP addresses from the data frames themselves.

Of course, as will be understood, the 6LoWPAN adaption layer 310 may also receive 6LoWPAN data frames from the WirelessHART network layer 315. In this case, the 6LoWPAN block 310 operates to generate one or more IPv6 data frames from the received 6LoWPAN data frames by defragmenting these data frames, i.e., by combining data payloads from various 6LoWPAN data frames or fragmented data frames to produce a IPv6 data frame. In this case, the 6LoWPAN block 310 may transmit the generated IPv6 data frames to the data frame routing block 308 or to the transport layer stack 311.

Now, when the WirelessHART network layer 315 receives 6LoWPAN data frames from the 6LoWPAN block 310, the WirelessHART network layer 315 may access a WirelessHART routing or linking table 316 stored or kept as part of the operation of the stack 300 to determine the location or routing information for the device within the WirelessHART network that has the IP address in or associated with the 6LoWPAN data frames (which will be the IP address of the original IPv6 data frame). Of course, the WirelessHART routing or linking table 316 may include several routing table entries and each routing or linking table entry may include the IPv6 address of an IPv6-enabled WirelessHART device on the WirelessHART network and the WirelessHART routing information for the IPv6-enabled WirelessHART device. Thus the routing or linking table 316 stores information that links particular IP addresses (i.e., routing information in the first network routing protocol) for devices within the WirelessHART communication network with WirelessHART routing information such as graph IDs, etc. (i.e., routing information for the second network routing protocol) for these devices to enable these devices to be reached using the WirelessHART routing protocol. In this case, the WirelessHART network layer 315 may utilize the IPv6 address associated with each of the 6LoWPAN data frames to "look-up" WirelessHART routing information for the WirelessHART device that has the IPv6 address from the WirelessHART routing table 316. The WirelessHART network layer 315 may then encapsulate each of the 6LoWPAN data frames with network routing information corresponding to the WirelessHART network routing protocol needed to route a data packet to the device within the WirelessHART network while maintaining the network routing information for the IPv6 protocol within those data packets. In addition, the WirelessHART network layer 315 may encode the WirelessHART network routing information with a flag that indicates that the underlying data packet is an IPv6 data packet or is based on an IPv6 data packet (i.e., is a 6LoWPAN fragment of an IPv6 data packet).

Of course, the WirelessHART network layer 315 may also receive WirelessHART-encapsulated 6LoWPAN data frames from a serial port driver 312. In this case, the WirelessHART network layer 315 may generate one or more 6LoWPAN data frames from the received WirelessHART-encapsulated 6LoWPAN data frames by stripping off the WirelessHART network routing information from these data packets and providing the generated 6LoWPAN data frames to the 6LoWPAN adaption layer 310.

The serial driver 312 may interface (which may implement a data link layer stack element and a physical layer stack element) with a serial receiver/transmitter device (not shown) to provide communications within the WirelessHART network. In one example, the serial receiver/transmitter device may operate according to the RS-232 protocol while in other another example, the serial receiver/transmitter device may operate according to the RS-485 protocol. The serial protocols listed herein only serve as examples and, in general, any suitable wired or wireless, serial or parallel protocol may be utilized. In any event, the serial driver 312 transmits WirelessHART-encapsulated 6LoWPAN data frames to WirelessHART access points (AP) such as access points 103 and 104 of FIG. 6, for example, via the serial receiver/transmitter device. Of course, the serial driver 312 may receive WirelessHART-encapsulated 6LoWPAN data frames from an WirelessHART access point (AP) via the serial receiver/transmitter device.

As previously discussed, when the data frame routing block 308 determines that the transport layer stack 311 is the intended recipient of an IPv6 data frame (using, for example, the IP routing table 309), the data frame routing block 308 may examine the received data frame (and in particular, the transport information within the header of that data frame) to determine if the data frame corresponds to a TCP, a UDP or an ICMP data frame. On determining that a received data frame corresponds to a TCP, a UDP or an ICMP data frame, respectively, the data frame routing block 308 may alert a TCP block 311-1, a UDP block 311-2 or an ICMP block 311-3 of the packet and provide the packet to the appropriate portion of the transport layer of the stack 311. In this case, one or more standard and/or custom applications may reside within an application layer 314 of the device in which the stack 300 is located and these standard applications may include, for example, those implementing the file transfer protocol (FTP), TELNET, hypertext transfer protocol (HTTP), simple network management protocol (SNMP), dynamic host control protocol (DHCP), etc. Custom applications may include those that perform specific tasks including monitoring and configuration of the IP-enabled gateway, for example. The applications resident in the application layer 314 may execute within a software framework provided by the application programming framework and interface 315. Resident applications may utilize software modules resident in the application programming framework and interface layer 315 to receive data frames from the TCP block 311-1, the UDP block 311-2 or the ICMP block 311-3. In some cases, the application programming framework and interface layer 315 may provide a "sockets" interface to enable executing applications to receive, process and send data frames. Additionally, resident applications may generate data frames in response to received data frames. The resident applications may generate data frames autonomously or in response to received data frames and the resident applications may transmit the generated data frames by utilizing software modules resident in the application programming framework and interface layer 315. These modules, in turn, may transmit the generated data frames to any one of the TCP block 311-1, the UDP block 311-2 or the ICMP block 311-3. The TCP block 311-1, the UDP block 311-2 or the ICMP block 311-3 may then append additional information to the data frames and transmit the data frames to the data frame routing block 308 for delivery to some other device, either via the ethernet interface 301 or the WirelessHART access point 313.

Figure 8:
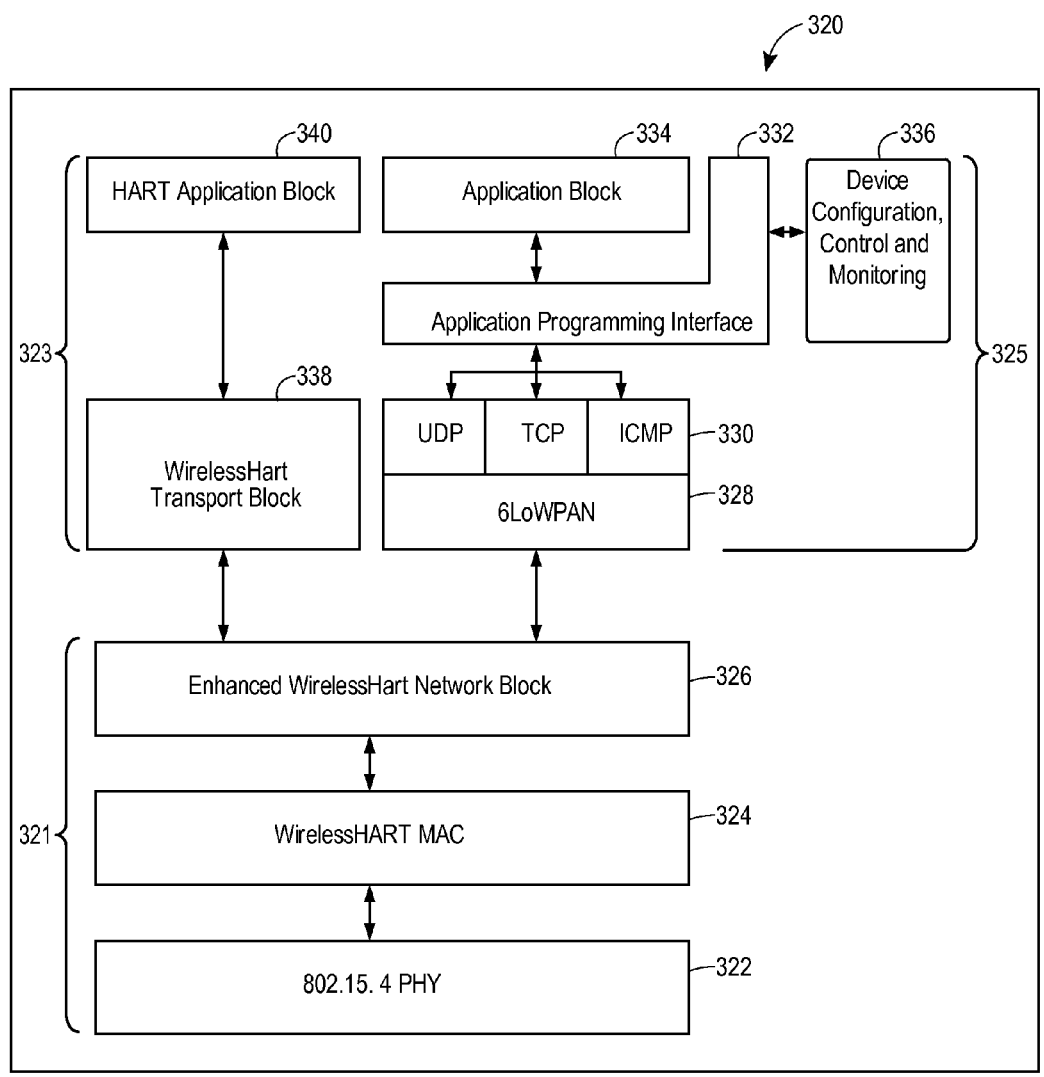
FIG. 8 is a block diagram of an example network protocol stack that may be used to receive and transmit IPv6 data frames as well as WirelessHART data frames from and to devices on a WirelessHART communications network.

FIG. 8 is a block diagram of another example network protocol stack 320 that may be implemented at an IP-enabled WirelessHART field device, for example, such as the field device 109 of FIG. 5, to implement both WirelessHART communications and communications using IPv6 data frames (or any other IP data frame). Generally speaking, the protocol stack 320 has a common set of lower layers 321 that implement the physical layer and the data link layer of the of a WirelessHART communications protocol as well as an enhanced WirelessHART network layer of the stack 320. The protocol stack 320 also includes two sets of upper layers 323 and 325, with each of the set of upper layers responsible for implementing the transport and application layers of either the WirelessHART communication network protocol (323) or an IP communication network protocol (325). Here, the common set of lower layers 321 is illustrated as including an 802.15.4 PHY block 322 that receives and transmits data frames via communication channels conforming to the 802.15.4 protocol standard associated with the WirelessHART communication network. The communication channels may correspond to communication channels in a WirelessHART communication network 100 of FIG. 6, for example. The 802.15.4 PHY block 322 communicates with hardware devices such as digital attenuators, synthesizers, analog filters, analog to digital convertors (ADC) and digital to analog convertors, as well as any other devices, within the WirelessHART communication network. To do so, the 802.15.4 PHY block 322 implements algorithms to filter, demodulate, and verify the integrity of received data frames, algorithms to transform data frames to a format which conforms with the 802.15.4 protocol standard before transmission, and algorithms to schedule the transmission of data frames to comply with the 802.15.4 protocol standard. As is generally the case, the 802.15.4 PHY block 322 is connected to a WirelessHART media access control (MAC) block 324 and transmits an indication to the block 324 when a data frame conforming to the 802.15.4 protocol standard is received. The 802.15.4 PHY block 322 (which is a physical layer stack element or physical layer element) also receives an indication from the WirelessHART MAC block 324 when a data frame is available to be transmitted via communication channels conforming to the 802.15.4 protocol standard and operates in standard manners to transmit that data frame over the WirelessHART network to another device within the WirelessHART network in such an instance.

In general, the WirelessHART MAC block 324 performs the steps of implementing the routing of received data frames according to the WirelessHART data link layer protocol and is thus a data link layer stack element. The WirelessHART MAC block 324 may examine the WirelessHART data link layer protocol header of a received data frame to determine the intended recipient device of the received data frame within the WirelessHART network. For example, the WirelessHART MAC block 324 may utilize the destination address field in the WirelessHART data link layer protocol header to determine the intended recipient of the received data frame. In one scenario, the destination address in the WirelessHART protocol header of a received data frame may correspond to the WirelessHART MAC address of the field device implementing WirelessHART MAC block 324. In this case, WirelessHART MAC block 324 may transmit an indication to the enhanced WirelessHART network layer 326 indicating the existence of this data packet and may forward the packet along for processing in the network layer 326. In another scenario, the WirelessHART MAC block 324 may determine that another field device is the intended recipient of a received data frame. In this scenario, the WirelessHART MAC block 324 may transmit the received data frame via the 802.15.4 PHY block 322 to the intended recipient device of the data frame.

The WirelessHART MAC block 324 may also receive data frames from the enhanced WirelessHART network block 326 (which is a network layer stack element for the WirelessHART network). As will be understood, the WirelessHART MAC block 324 may encapsulate the data frames to be sent over the WirelessHART network with a WirelessHART data link protocol header. The WirelessHART MAC block 324 may update the WirelessHART data link protocol header with information corresponding to the destination address, for example, of the intended recipient device or devices. As previously described, the WirelessHART MAC block 324 may instruct the 802.15.4 PHY block 322 that a data frame is available to be transmitted.

The enhanced WirelessHART network block 326 operates to receive an indication from the WirelessHART MAC block 324 when the destination address for example, in the WirelessHART protocol header of a received data frame, indicates that the field device is the intended recipient of the data frame. As previously explained, a transmitting device, for example, an IPv6 enabled WirelessHART gateway 11 of FIG. 1 or another field device within the WirelessHART network, may include a flag in the WirelessHART network routing protocol header encapsulating an IPv6 data frame fragment indicating that the data frame is associated with an underlying IPv6 data packet or data frame. The enhanced WirelessHART network block 326 may determine if the received data frame is an IPv6 data frame fragment based on detecting the flag or indication in the WirelessHART network layer protocol header or if, instead, the received data frame is a standard WirelessHART data packet. Upon detecting the flag indicating that the packet contains an IPv6 packet or fragment, the enhanced WirelessHART network block 326 may copy the IPv6 data frame fragment to a queue and may provide an indication to a 6LoWPAN block 328 within the second set of upper layers 325 that one or more IPv6 data frame fragments are copied to the queue.

Additionally, during operation, the enhanced WirelessHART network block 326 may receive IPv6 data frame fragments from the 6LoWPAN block 328 for sending over the WirelessHART network using the WirelessHART network routing protocol. To do so, the WirelessHART network block 326 encapsulates the received IPv6 data frames with a WirelessHART network routing protocol header while maintaining all of the IP network routing protocol information within these packets. However, the enhanced WirelessHART network block 326 also sets the flag or other indication in the WirelessHART network routing protocol header indicating that the WirelessHART data packet (or network routing protocol header) encapsulates an IPv6 data frame fragment.

When a set of packets is delivered to the second set of upper layers of the stack 325 associated with IP data packets, the 6LoWPAN block 328 operates to reassemble the one or more IPv6 data frame fragments received from the enhanced WirelessHART network block 326 to generate an IPv6 data frame. The 6LoWPAN block 328 may transmit an indication to an IPv6 network routing layer block and transport layer protocol block 330 when the 6LoWPAN block 328 generates an IPv6 data frame. The 6LoWPAN block 328 may also receive IPv6 data frames from the IPv6 network routing layer block and transport protocol block 330 and, in this case, the 6LoWPAN block 328 operates to fragment the IPv6 data frames into one or more data frame fragments using the 6LoWPAN fragmentation technique. Upon doing so, the 6LoWPAN block 328 transmits an indication to the enhanced WirelessHART network block 326 and/or provides the network block 326 with the generated data frame fragments for sending over the WirelessHART communications network using the WirelessHART network routing protocol, along with an indication of the WirelessHART device to which the packets should be transmitted. In many cases, this indication may be to a gateway device in the WirelessHART network. In any event, structural and functional elements of the 6LoWPAN block 328 are discussed in more detail with reference to FIG. 9.

Moreover, within the second set of upper layers of the stack 325, the IPv6 network routing layer block and transport protocol block 330 implements a network routing layer stack element and a transport layer stack element that performs IP based network routing protocol activities and transport layer protocol processing, and may include any or all of a UDP, a TCP or an ICMP transport block that either decodes IPv6 data frames provided by the 6LoWPAN block 328 or encodes IPv6 data frames provided by an application block 334 via an application programming interface (API) 332. Examples of an application programming interface include a sockets interface. Of course, the block 330 also performs network routing layer activities, such as encoding and decoding of network routing information in the IPv6 data packets. Separately, applications executing in the application block 334 may access, control and configure field device specific information 336 via the application programming interface 332. Applications executing in the application block 334 (which is or implements a IP or sockets based application layer stack element) may conform to the constrained application protocol (CoAP). Details of the CoAP protocol are available at web URL, tools.ietf.org/html/draft-ietf-core-coap-03.

As an example, an application executing in the application block 334, may receive a request for field device status information from a remote computing device, for example, the device 116 of FIG. 6, via a WirelessHART communication network 100. The application may retrieve the field device status information via the application programming interface 332 and transmit the status information as one or more IPv6 data frames via the IPv6 transport protocol block 330, the 6LoWPAN block 328, and the common set of lower layers 321 of the stack be delivered to the computing device 116. As previously described with reference to FIG. 6, the IPv6 data frames may be transmitted via the WirelessHART communication network 100 to the computing device 116.

As previously discussed, the enhanced WirelessHART network block 326 may process an incoming data packet received from the WirelessHART MAC block 324 and determine that the data frame encapsulated by a WirelessHART network routing protocol header corresponds to an IPv6 data frame fragment by detecting the existence of a flag within the network routing information of that data packet. However, in instances where the WirelessHART protocol header encapsulating a received data frame does not include the flag (or the flag is not set to indicate an underlying IPv6 data packet), the enhanced WirelessHART network block 326 transmits an indication to a WirelessHART transport block 338 within the first set of upper layers of the stack 323 of the existence of a standard WirelessHART data packet. The WirelessHART transport block 338 which implements a WirelessHART transport layer stack element may then access this data packet, process the data packet using standard WirelessHART transport layer processing and transmit an indication to a HART application block 340 (which is or implements a WirelessHART application layer stack element) after processing the received data frame. The application block 340 then implements WirelessHART compliant applications to process the data packet in any known or desired manner.

As will be understood, the enhanced WirelessHART network block 326 may also receive WirelessHART data frames for transmission via the WirelessHART network from the WirelessHART transport block 338. As previously mentioned, the WirelessHART network block 326 may operate to encapsulate the received WirelessHART data frames with a WirelessHART network protocol header. However, the enhanced WirelessHART network block 326 does not flag the data frames received from the WirelessHART transport block 338 as IPv6 data frames fragments in this case because the data frames were received from the WirelessHART transport block 338 and thus are standard WirelessHART data packets. As a result of this operation, the WirelessHART network block 326 processes the WirelessHART packets according to known WirelessHART network routing protocol procedures to send the WirelessHART packets over the WirelessHART communication network.

As previously mentioned applications resident in the application layer 314 of FIG. 7 and application block 334 of FIG. 8 may be adapted to operate by utilizing an API. Programming information including the invocation of functionalities in the API may be made available by field device vendors in the form of a software development kit (SDK). In operation, third-party software developers may receive the SDK via a tangible, non-transitory medium, such as a CD-ROM. Developers may create custom application on general purpose computers by utilizing the SDK. Such custom applications may be "pushed" to a field device via the internet and the WirelessHART network if so desired. Alternatively, vendors may "host" such custom applications at an online application store. Plant operators may selectively "pull" custom applications to a field device from the online application store via the internet and the WirelessHART network.

Figure 9:
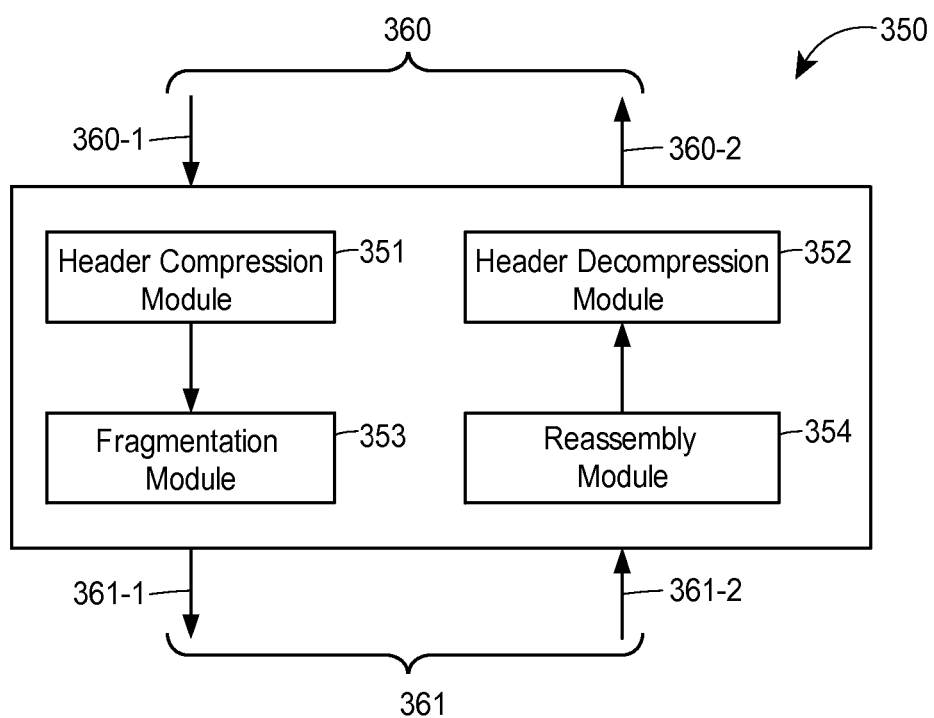
FIG. 9 is a block diagram of an example 6LoWPAN block that may be implemented at field devices or gateways operating in a WirelessHART communication network to provide routing of IPv6 data frames over a non-IP communication network such as the WirelessHART network.

FIG. 9 is a block diagram of an example 6LoWPAN block 350 that may generate IPv6 data frames from received 6LoWPAN data frames and 6LoWPAN data frames from received IPv6 data frames, respectively. The 6LoWPAN block 350 may correspond to the 6LoWPAN adaptation layer 310 of FIG. 7, in which case the 6LoWPAN block 350 may communicate via an interface 360 with a data frame routing block 308 (FIG. 7). The 6LoWPAN block 350 may also communicate via an interface 361 with a WirelessHART network layer 315 (FIG. 7). In another example, a 6LoWPAN block 350 may correspond to the 6LoWPAN block 328 of FIG. 8. In this example, the 6LoWPAN block 350 may receive and transmit IPv6 data frames from and to the IPv6 transport protocol block 330 of FIG. 8 and the 6LoWPAN block 350 may receive and transmit IPv6 data frame fragments to and from the enhanced WirelessHART network block 326 of FIG. 8.

As illustrated in FIG. 9, the 6LoWPAN block 350 may include a header compression module 351 communicatively coupled to a fragmentation module 353 and a reassembly module 354 communicatively coupled to a header decompression module 352. Here, the header compression module 351 may receive IPv6 data frames via the interface 360-1 and may operate on a received IPv6 data frame to generate a 6LoWPAN compliant compressed IPv6 header. The fragmentation module 353 coupled to header compression module 351 receives the IPv6 data frame including the compressed IPv6 header from the header compression module 351 and operates to "fragment" the IPv6 data frame into several 6LoWPAN compliant data frames. The fragmentation module 353 may append a "fragment header" to each of the several 6LoWPAN data frames. An example fragmentation module 353 is described below with reference to FIG. 10A. The fragment header may include information that allows for the reassembly of the several 6LoWPAN data frames into the original IPv6 data frame. Of course, the reassembly may be performed at a device which is the intended recipient of the IPv6 data frame or at an intermediate device. Information pertaining to the generation of a compressed IPv6 header and the fragmentation of an IPv6 data frame according to 6LoWPAN protocol is more particularly described in RFC 4944, "Transmission of IPv6 Packets over IEEE 802.15.4 Networks."

The fragmentation module 353 of FIG. 9 may transmit the several 6LoWPAN compliant data frames generated from an IPv6 data frame to a WirelessHART network layer 315, for example, via an interface 361-1. As part of this process, the fragmentation module 353 may provide the WirelessHART network layer 315 with the IPv6 address of the intended recipient of the several 6LoWPAN compliant data frames. As previously described, the WirelessHART network layer 315 may utilize the IPv6 address to "lookup," from a WirelessHART routing table 316 (FIG. 7), WirelessHART routing information for an IPv6-enabled WirelessHART device that is the intended recipient of the several 6LoWPAN data frames. Of course, such look up tables may exist in any of the other IP-enabled WirelessHART devices described herein.

Separately, the 6LoWPAN block 350 of FIG. 9 may receive 6LoWPAN data frame fragments from the WirelessHART network layer 315, for example, via an interface 361-2. The 6LoWPAN data frames themselves may be generated from an IPv6 frame by an IPv6-enabled WirelessHART device. A reassembly module 354 may then generate an IPv6 data frame from the received 6LoWPAN data frames. Each of the received 6LoWPAN data frame fragments will typically include a fragment header and the reassembly module 354 utilizes the fragment headers to reassemble an IPv6 data frame in any known manner. An example reassembly module 354 is described below with reference to FIG. 10B. The reassembly module 354 may transmit a reassembled IPv6 data frame to the header decompression module 352 which "decompresses" the compressed IPv6 header to create the original IPv6 header (with the IP network routing protocol information, such as the IP addresses of the data packet). The header decompression module 352 then transmits the IPv6 data frame to, for example, a data frame routing block 308 of FIG. 7 via an interface 360-2.

Figure 10A:
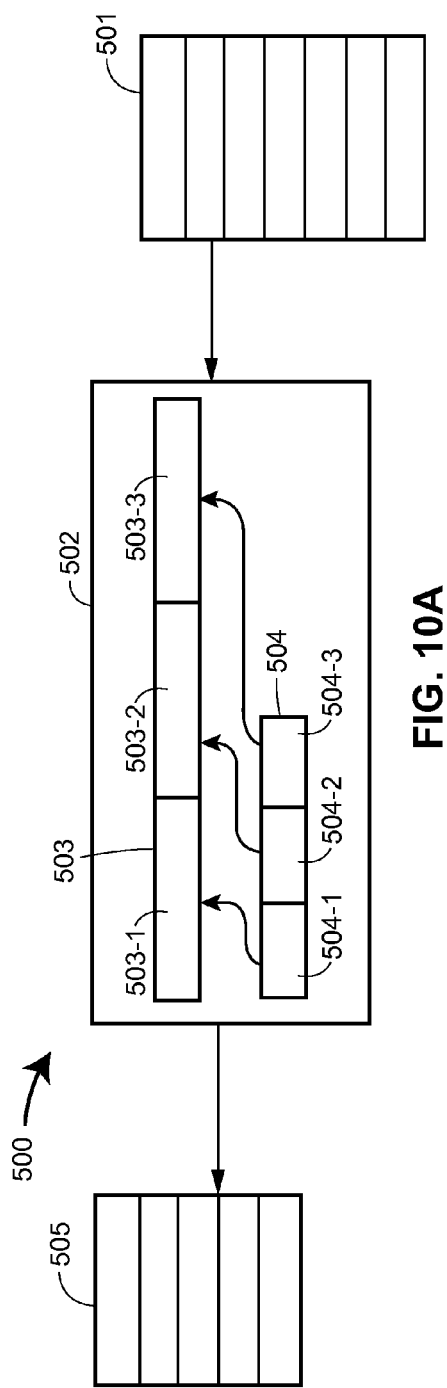
FIG. 10A is a block diagram of an example fragmentation module that may be implemented in the example 6LoWPAN block of FIG. 8.

FIG. 10A depicts an example fragmentation module 500 that may be implemented in the 6LoWPAN block 350. In this case, a queue 501 may receive one or more IPv6 data frames from the header compression module 351 and a fragmenter 502 may receive an indication when one or more IPv6 data frames are received in the queue 501. The fragmenter 502 may fragment the one or more IPv6 data retrieved from a queue 501 using standard 6LoWPAN fragmenting techniques and may store the fragments in a send buffer 503. Here, each of a set of fragments 503-1, 503-2 and 503-3 correspond to different fragments from a 6LoWPAN data frame and the size (length) of these fragments may be chosen to assure that each fragment will fit within the maximum allowed size of a data packet within the WirelessHART protocol after other expected WirelessHART network routing, data link and physical layer information is added thereto. As previously discussed, the fragmenter 502 may append a fragment header to each of the several 6LoWPAN data frames 503-1, 503-2, 503-3, etc. The fragment headers may be appended to each of the 6LoWPAN data frames 503-1 . . . 503-3 before the 6LoWPAN data frames 503-1 . . . 503-3 are stored in the send buffer 503 if desired. Although, the send buffer 503 is depicted as a single contiguous buffer, in other embodiments a send buffer 503 may include several non-contiguous buffers.

The fragmenter 502 may also include a send buffer map 504 which may include several pointers 504-1 . . . 504-3, each of which references a location in the send buffer 503. Each of these pointers may indicate the start of a 6LoWPAN data frame. If desired, each pointer may also be associated with a status block that may indicate a status for the corresponding 6LoWPAN data frame. The fragmenter 502 may access the send buffer 503 based on the send buffer map 504 and may transfer each of the 6LoWPAN data frames 503-1 . . . 503-2 to the out bound queue 505. In this case, the fragmenter 502 may transmit an indication to a WirelessHART network layer 315 after each of the 6LoWPAN data frames 503-1 . . . 503-2 is transferred to the out bound queue 505 and, as previously discussed, the fragmenter 502 may provide the WirelessHART network layer 315 with the IP address of the intended recipient of the 6LoWPAN data frames 503-1 . . . 503-3, etc.

Figure 10B:
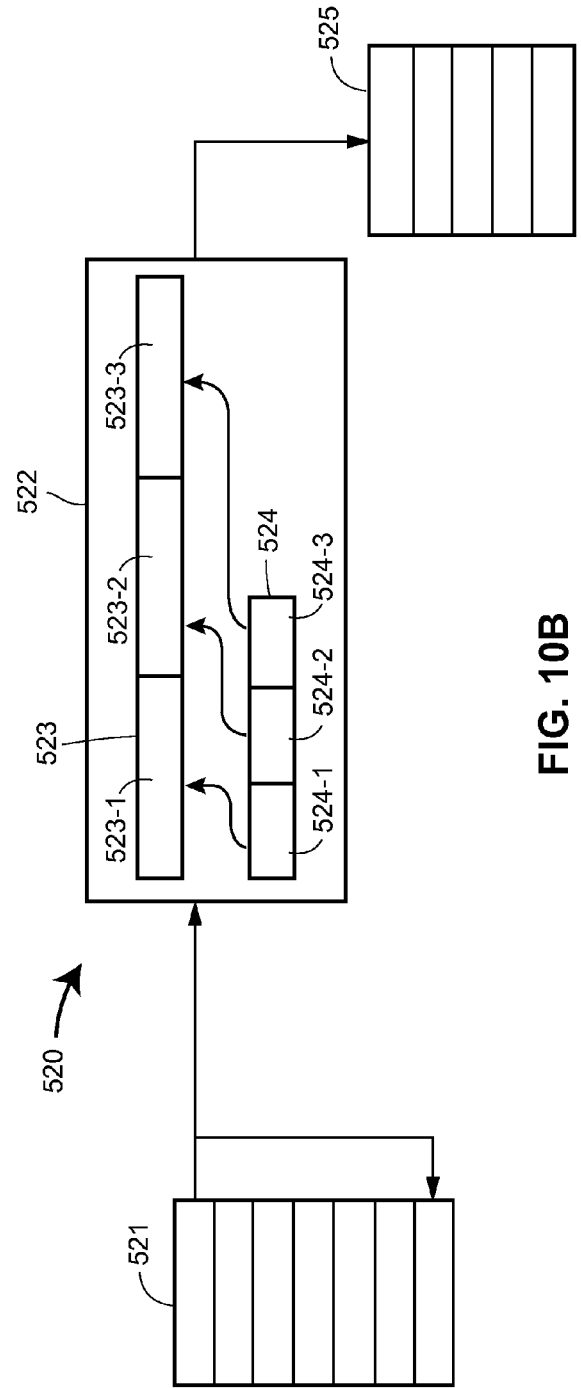
FIG. 10B is a block diagram of an example reassembly module that may be implemented in the example 6LoWPAN block of FIG. 8.

FIG. 10B depicts an example reassembly module 520 that may be implemented in, for example, the 6LoWPAN adaptation module 350. Here, a reassembly module 520 includes a reassembler 522 that receives an indication from a WirelessHART network layer (e.g., network layer 315) when one or more 6LoWPAN data frames are received in an inbound queue 521. The reassembler 522 may transfer each of the 6LoWPAN data frames from the inbound queue 521 into a receive buffer 523. The reassembler 522 may then utilize the fragment headers which were appended to each of the 6LoWPAN data frames when being created to generate an IPv6 data frame using standard or well-known 6LoWPAN reassembly techniques. The reassembler 522 may utilize a receiver buffer map 524 to track the reception of each of the 6LoWPAN data frames that make up a particular IPv6 data frame. In one scenario, the WirelessHART network layer 315 may receive 6LoWPAN data frame out of order and the reassembler 522 may still reassemble the IPv6 data frame when all of the data packets including the data frame fragments have been received and stored in the inbound queue 521.

FIG. 11A depicts an illustration of an example data frame 550 that may be received via the internet as a IP data frame and transmitted via a second network routing protocol, such as a WirelessHART network routing protocol, using low power fragmentation techniques. For purposes of illustration, the data frame 550 may be an IPv6 data frame and is assumed to be received at an IPv6-enabled WirelessHART gateway via the internet. As will be seen in FIG. 11A, the data frame 550 includes application payload data 550-1 that may be generated by a remote computing device as well as the various other headers and trailers appended thereto according to normal operation of IP data packet creation and routing.

A suitable protocol may be utilized to fragment the IPv6 data frame 550 into one or more data frame fragments 552-1 ... **552-*n*. In this example, the IPv6 data frame 550 may be fragmented using methods that conform to the 6LoWPAN protocol but other fragmentation techniques may be used instead. Each data frame fragment may be encapsulated with 6LoWPAN fragment header information 553 so that the data frame fragment 552-1 is illustrated as being encapsulated with fragment header information 553-1. The data frame fragment header information is illustrated as including a fragment header, a compressed IP protocol header, and a compressed transport protocol header (for an IP transport protocol), while the payload of each data frame fragment is a portion of the application payload 550-1** of the original IPv6 data packet.

As will be understood, each data frame fragment, such as the data frame fragment 552-1, is encapsulated with a suitable second network routing protocol header to enable the routing of the data frame fragment 552-1 within a low power network such as the WirelessHART network. In this example, the data frame 552-1 may be encapsulated with a WirelessHART protocol header to generate a WirelessHART encapsulated IPv6 data frame fragment 554. The WirelessHART protocol header comprises a WirelessHART network routing header 554-1 and a WirelessHART data link layer header 554-2. The WirelessHART encapsulated IPv6 data frame fragment 554 may be further encapsulated with a physical header 554-3 and a physical trailer 554-4 conforming to the low power communication standard, for example the 802.15.4 standard, before being transmitted via the WirelessHART communication network.

One or several bits in the data fields corresponding to WirelessHART protocol may be apportioned to indicate to a receiving device that the data frame fragment corresponds to an IPv6 data frame. FIG. 11B illustrates a DLPDU field 560 of the HART network routing header 554-1. In this example, bit 7 (indicated by reference number 561) is utilized as a flag to indicate to a receiving device that the WirelessHART header encapsulates an IPv6 data frame fragment. Bit 7 (561) may be set to a '1' before the WirelessHART data frame is transmitted to indicate the existence of an IPv6 data frame fragment within the WirelessHART data frame. Referring to FIGS. 7 and 8, the WirelessHART network layer 315 and the enhanced WirelessHART network block 326 may set bit 7 (561) of the DLPDU field 560 of a WirelessHART network routing protocol header to a logic '1' before a data frame is transmitted.

FIG. 11C corresponds to the control byte 565 of a WirelessHART network routing header 554-1 and the data fields in the control byte 565 may also or instead be apportioned to indicate if the WirelessHART protocol header encapsulates a data frame fragment received via an encrypted communication channel. For example, bit 4 (indicated with reference number 566) may be utilized to indicate if the data frame fragment is received via encrypted WirelessHART communication channels. In this example, bit 5 (567) is utilized to indicate the location of a security header within a data frame fragment.

Table 1 below indicates a set of possible combinations of bit 4 (566) and bit 5 (567) of the control byte that may be used to provide encryption and security within the WirelessHART network routing information.

TABLE 1

| Bit 4 (566) | Bit 5 (567) | Interpretation |
| --- | --- | --- |
| 0 | Not applicable | No WirelessHART security |
| 1 | 1 | WirelessHART security layer before fragment header |
| 1 | 0 | WirelessHART security layer after fragment header |

The settings of bit 4 and bit 5 may be configured at an IPv6 enabled WirelessHART gateway and in field devices within a WirelessHART network. Referring to Table 1, in instances where bit 4 is configured to be a logic '0', field devices operating within WirelessHART communication networks may utilize secure IP communications to receive and transmit data frames. Alternatively, the field devices may communicate via unsecure communication channels. In instances where secure IP communication channels are utilized, the applications may be responsible for enforcing secure communications.

In instances where bit 4 (566) is configured to a logic '1' and bit 5 (567) is configured to be a logic '1', an IPv6 enabled WirelessHART gateway may implement methods at the WirelessHART network layer to insert a security header after the WirelessHART network header 554-1. In these instances, an IPv6 enabled WirelessHART may receive IPv6 data frames from the internet via secure IP communication channels but the IPv6 data frame fragments may be decrypted before being fragmented at an IPv6 enabled WirelessHART gateway.

In instances where bit 4 (566) is configured to a logic '1' and bit 5 (567) is configured to be a logic '0', an IPv6 enabled WirelessHART gateway may implement methods at the WirelessHART network layer to insert a security header after the 6LoWPAN data frame fragment header 554-5. A receiving field device would interpret bit 4 and bit 5 to enforce the appropriate security mechanism when receiving and transmitting IPv6 data frame fragments.

As was discussed with reference to FIG. 8, the enhanced WirelessHART network block 326 may determine that bit 7 (561) of a received data frame is not set (0). In this case, the enhanced WirelessHART network block 326 transmits an indication to the WirelessHART transport block 338 of the incoming data frame for processing using standard WirelessHART communications. The data frame 554 may include a WirelessHART protocol indicator field which may include information utilized by the WirelessHART transport block 338 and/or the HART application block 340 to determine, for example, which WirelessHART protocol or WirelessHART application the data frame 554 application payload corresponds to.

Referring back to the example network of FIG. 6, an IPv6 enabled WirelessHART field device 108 may receive WirelessHART protocol encapsulated IPv6 data frames fragments via a WirelessHART communication network 100 wherein the intended recipients of the received IPv6 data frame fragments are other IPv6 enabled field devices. The IPv6 enabled field device 108 may also receive WirelessHART protocol encapsulated non-IPv6 data frames via the WirelessHART communication network 100 wherein the intended recipients of the received IPv6 data frame fragments are other IPv6 enabled field devices. Several methods that may be implemented at WirelessHART field devices to route IPv6 data frame fragments within a WirelessHART communication network will now be discussed in more detail. As will be understood, IPv6 enabled WirelessHART field devices and in some cases non-IPv6 enabled WirelessHART field devices may be configured to utilize any one of the several methods discussed below to route IPv6 data frame fragments and standard WirelessHART data frames within a WirelessHART communication network. Although, in some cases, the foregoing methods discussed below use a single intermediate IPv6 enabled WirelessHART device or a single intermediate non-IPv6 enabled WirelessHART device to route IPv6 data frame fragments between two other IPv6 enabled WirelessHART field devices, several intermediate IPv6 enabled WirelessHART devices or non-IPv6 enabled WirelessHART devices may be used as intermediate devices in the methods discussed below to allow for "multi-hop" routing of IPv6 data frames within a WirelessHART communication network.

Figure 12:
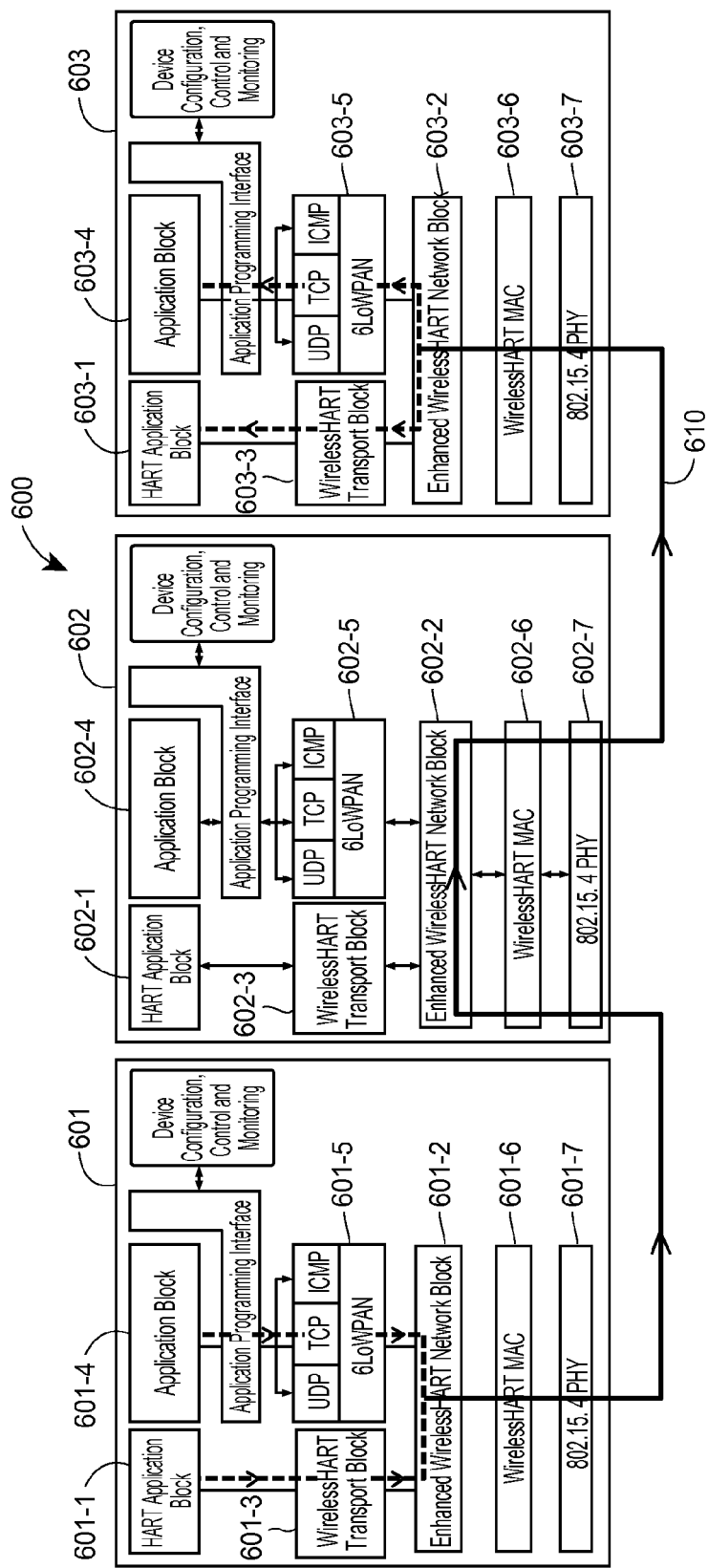
FIG. 12 illustrates a set of WirelessHART devices on a WirelessHART communication network that implement a first example communication technique to route IPv6 data frames and WirelessHART data frames within the WirelessHART communication network.

FIG. 12 depicts an illustration of an example routing method that may be implemented in IPv6 enabled WirelessHART field devices within an example WirelessHART communication network 600. Network communication stacks 601, 602 and 603 of various different IPv6 enabled WirelessHART field devices within the network 600 are each implemented in separate IPv6 enabled WirelessHART field devices. As will be understood, the stacks 601, 602 and 603 may be the same as or similar to and may generally operate in accordance with the description of the stack 320 of FIG. 8. In this case, the network communication stack 602 is implemented in an intermediate WirelessHART field device and operates to route both WirelessHART data frames and IPv6 data frame fragments encapsulated in WirelessHART data frames between the field devices implementing the network communication stacks 601 and 603. As will be understood, the IPv6 data frame fragments are routed over the communication network 600 based on information included in a WirelessHART protocol header (including network routing information, data link layer information and physical layer protocol information) encapsulating each one of the IPv6 data frame fragments.

In one example scenario, an application executing in a HART application block 601-1 within the stack 601 generates a WirelessHART data frame intended for an application executing in HART application block 603-1 of the device implementing the stack 603. The application block 601-1 provides that data frame to a WirelessHART transport block 601-3 for delivery to the enhanced WirelessHART network block 601-2 which processes the data packet by adding WirelessHART network routing information to the data packet and sending this data packet to the WirelessHART MAC (data link) layer 601-6 and to the physical layer 601-7 for processing and routing over the network 600. In another example scenario, an application executing in an application block 601-4 generates an IPv6 data frame intended for an IPv6 application executing in an application block 603-4 of the device that implements the stack 603. As previously described with reference to FIG. 8, a 6LoWPAN block 601-5 in the IP transport layer of the stack 601 fragments the IPv6 data frames received from the application executing in the application block 601-4. In this case, the enhanced WirelessHART network block 601-2 encapsulates each of the IPv6 data frame fragments (from the application block 601-4 and the 6LoWPAN block 601-5) with a WirelessHART protocol header as described above using the lower layers of the stack 601-2, 601-6 and 601-7. Of course, the enhanced WirelessHART network block 601-2 updates the WirelessHART protocol header corresponding to each such data frame with routing information corresponding to the logical address of or route to the WirelessHART field device implementing network communication stack 603, before transmitting the data frame via the WirelessHART communication network. This information may be stored in routing tables (not shown in FIG. 12) which relate IP addresses of devices within the WirelessHART network to WirelessHART routing information for reaching those devices. The enhanced WirelessHART network block 601-2 also encodes the WirelessHART protocol header of data frames corresponding to IPv6 data frame fragments with a flag indicating that the WirelessHART protocol header encapsulates an IPv6 data frame fragment, before transmission.

After being sent over the network, an IPv6 enabled field device implementing the communication stack 602 receives the several WirelessHART encoded IPv6 data frame fragments or the WirelessHART packets and processes these packets in the physical layer 602-7, the data link layer 602-6 and the network layer 602-2 portions of the stack 602. In both cases, the WirelessHART network routing information of each data packet (either of a WirelessHART data packet or the IPv6 data frame fragment encapsulated with WirelessHART protocol header) will indicate that the packet is to be sent along to another device in the WirelessHART network 600. The lower layers 602-7, 602-6 and 602-2 of the communication stack 602 processes the packet, using standard WirelessHART network routing and data link and physical link addressing to decode and re-encode appropriate WirelessHART network routing, data link and physical layer information in the packet prior to sending this packet to the next WirelessHART device, in this case the device implementing the stack 603. As will be understood, because the data packet (either a WirelessHART data packet or an IPv6 data packet encapsulated with WirelessHART network routing information) is not addressed to an application within the device implementing the stack 602, each data packet only needs to be processed up to the WirelessHART network block 602-2 of the stack 602 to be routed through this device. Thus, in this case, the enhanced WirelessHART network block 602-2 utilizes the information in the WirelessHART protocol header encapsulating each of the received data frame fragments or in the WirelessHART packet to perform network and data link layer routing (using the WirelessHART network and data link routing protocols) to send the received data frame fragments or the WirelessHART packet to an IPv6 enabled field device implementing communication stack 603. The path 610 corresponds to an illustrative route that both IPv6 and non-IPv6 data frames may traverse with the dotted lines indicating the different paths a standard WirelessHART packet or an IPv6 encoded packet traverses within the stacks 601, 602, 603.

Of course, when the messages or data packets are received at the device implementing the stack 603, the messages are processed as described above with respect to FIG. 8 up to the enhanced WirelessHART network block 603-2. In this case, because the packet is ultimately addressed, via the network routing information of the data packet, to an application in the device implementing the stack 603, the network block 603-2 provides the decoded packet to either the WirelessHART transport block 603-3 (when the packet is a WirelessHART packet or data frame) or to the IP transport layer 603-5 (when the packet contains fragmented IPv6 data frames) for decoding and processing. Of course, in the later case, the IP network routing information is maintained at the block 603-5 so that the IP address of the recipient application can be used and determined, to thereby deliver the IPv6 data frame to the appropriate socket for delivery to the correct application in the application layer 603-4 of the stack 603.

Figure 13:
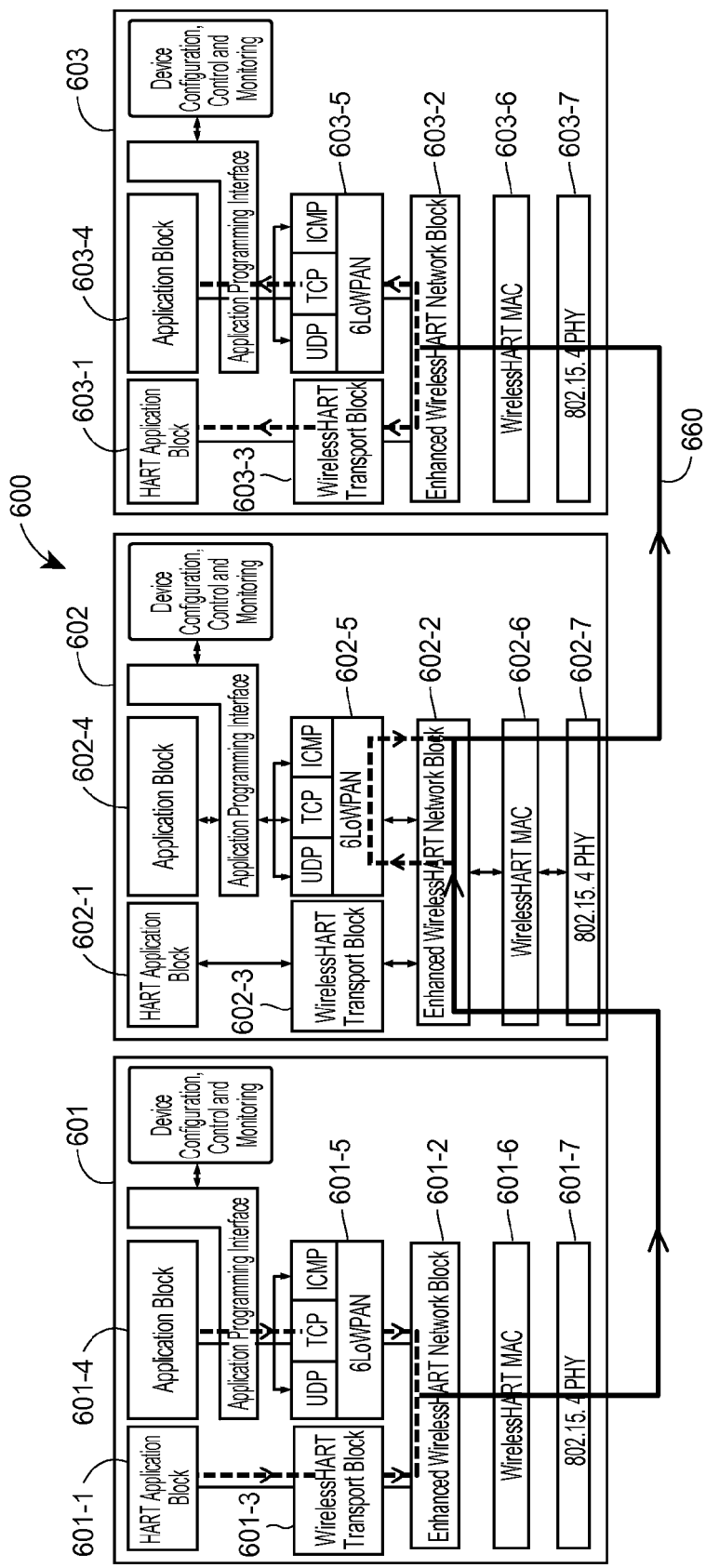
FIG. 13 illustrates a set of WirelessHART devices on a WirelessHART communication network that implement a second third example communication technique to route IPv6 data frames and WirelessHART data frames within a WirelessHART communication network.

FIG. 13 illustrates another example routing method that may be implemented in IPv6 enabled WirelessHART field devices within the example WirelessHART communication network 600. This communication method is very similar to that described with respect to FIG. 12 with one difference. In this method, the intermediate IPv6 enabled WirelessHART field device (implementing the stack 602) routes non-IPv6 data frame fragments by utilizing the information included in the WirelessHART protocol header, but reassembles and re-fragments IPv6 data frame fragments before re-routing the re-fragmented IPv6 data frame fragments back out over the WirelessHART network 600. This technique may be required in IPv6 enabled WirelessHART devices, such as routers or gateways, that may need to use IP addresses to determine if or how to route the data frame or message over the WirelessHART network or that may implement IP based security techniques using data in the IP network routing information within an IPv6 data packet.

As illustrated in FIG. 13 by the route line 660, the IPv6 enabled WirelessHART device that implements the stack 601 creates WirelessHART packets and/or IPv6 data packets to be sent over the network 600 and these packets are processed in the stack 601 as described above to be placed onto the communications network 600. The intermediate IPv6 enabled WirelessHART field device implementing the communication stack 602 receives IPv6 data frame fragments and non-IPv6 data frames (e.g., WirelessHART data frames) via standard WirelessHART routing techniques. The received packets are processed in the lower stack layers 602-7, 602-6 and 602-2 as described above. However, the WirelessHART network block 602-2 now operates to detect the presence of a flag in the WirelessHART protocol header indicating that the data frame is an IPv6 data frame fragment and, when such a flag is detected, the enhanced WirelessHART network block 602-2 routes the IPv6 data frame fragments to the 6LoWPAN block 602-5. The enhanced WirelessHART network block 602-5 then decodes the IPv6 network layer information from the data frame fragments by, for example, defragmenting these packets and then reading the IPv6 network layer information from these packets to obtain IP address and security information as may be needed for standard IP routing. This action is indicated by the dotted line portion of the path 660 through the block 602-5. Here, the 6LoWPAN block 602-5 reassembles the several IPv6 data frame fragments utilizing the information in the 6LoWPAN fragment headers to regenerate the IPv6 data frame. The 6LoWPAN block 602-5 then decodes and utilizes the destination IP address information and/or security information in the IP header of the generated IPv6 data frame and may perform security processing. In addition the block 602-5 may look up WirelessHART address information corresponding to the IPv6 enabled WirelessHART field device implementing the communication stack 603, i.e., the device to which the IPv6 data frame is addressed using IPv6 addressing. The 6LoWPAN block 652-2 may then fragment the generated IPv6 data frame into several IPv6 data frame fragments before transmitting the IPv6 data frame fragments back out via the enhanced WirelessHART network block 602-2 with information as to the WirelessHART device to which the data frames should be sent via the WirelessHART communication network 600. The enhanced WirelessHART network block 602-2 then adds WirelessHART network routing information to these frames and sends these frames for processing at the lower levels 602-6 and 602-7 of the stack 602 for routing over the WirelessHART communication network 600.

At the receiving device that implements the stack 603, the data packets are processed as described above and are provided to the appropriate application layer or block 603-1 or 603-4 based on the type of data frame. Of course, while only one intermediate device implementing the stack 602 is illustrate in FIG. 13, more than one intermediate device could be located within the path 660 and each such intermediate device could perform the processing described above with respect to the stack 602.

Figure 14:
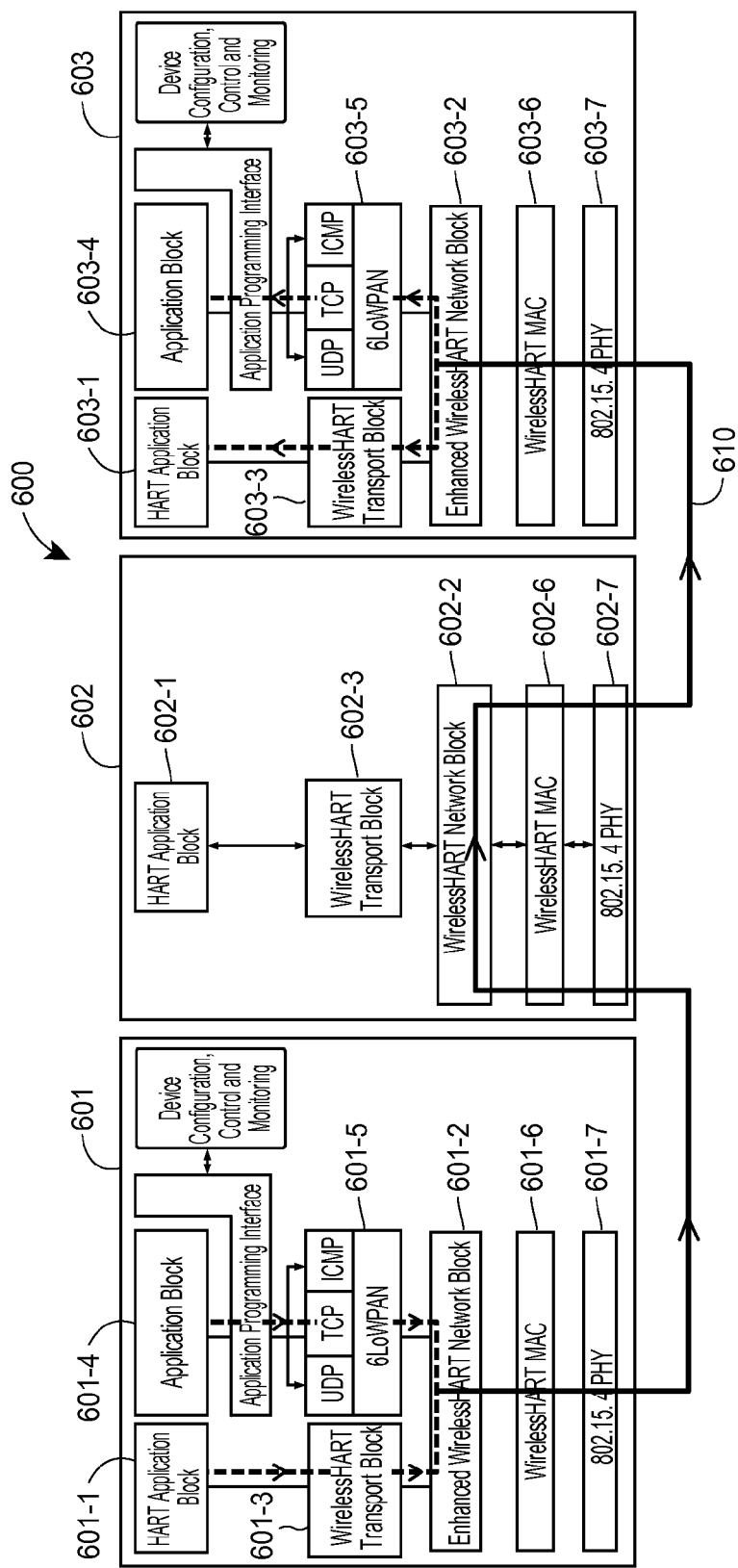
FIG. 14 illustrates a set of WirelessHART devices on a WirelessHART communication network that implement a third example communication technique to route IPv6 data frames and WirelessHART data frames within a WirelessHART communication network using WirelessHART devices that do not support IPv6 data frames or IPv6 network routing mechanisms.

FIG. 14 illustrates yet another routing or communication method that could be used to route or deliver both WirelessHART data packets and IPv6 data packets over a WirelessHART communication network. In the example of FIG. 14, routing takes place in the same manner as described above with respect to FIG. 12. However, in this case, one or more of the intermediate devices may be a non-IP enabled field device, and so does not include the network, transport and application layers of an IP based network stack. As illustrated in FIG. 14, however, both IP based data frames and WirelessHART data frames can still be routed through these intermediate devices, as each data packet is processed only up to the WirelessHART network layer block 602-2 before being re-encoded and sent to the next device in the route. That is, in this case, intermediate devices in the WirelessHART network do not have to be IPv6 enabled because routing through these devices can occur using only WirelessHART network routing protocol information. As a result, the network layer block 602-2 in the stack 602 does not need to be an "enhanced" WirelessHART network layer because this block does not need to recognize the existence of underlying IPv6 data packets or encode flags into the WirelessHART network routing layer information indicating the existence of these types of data packets.

As previously discussed with reference to, for example, FIGS. 7 and 8, the application layer 314 and the application block 334 may include custom applications which may utilize the application programming framework and interface 315 and application programming interface 332 to receive and transmit generated IPv6 data frames via a WirelessHART communication network. A vendor of IPv6-enabled WirelessHART field devices 107, 108, 109 and 110 of FIG. 6, for example, may in some scenarios create a software development kit (SDK) to enable third-party application developers to create and distribute custom applications. Such an SDK may be provided via a CD-ROM, for example or may be downloaded from a server (not shown) via the internet.

Figure 15:
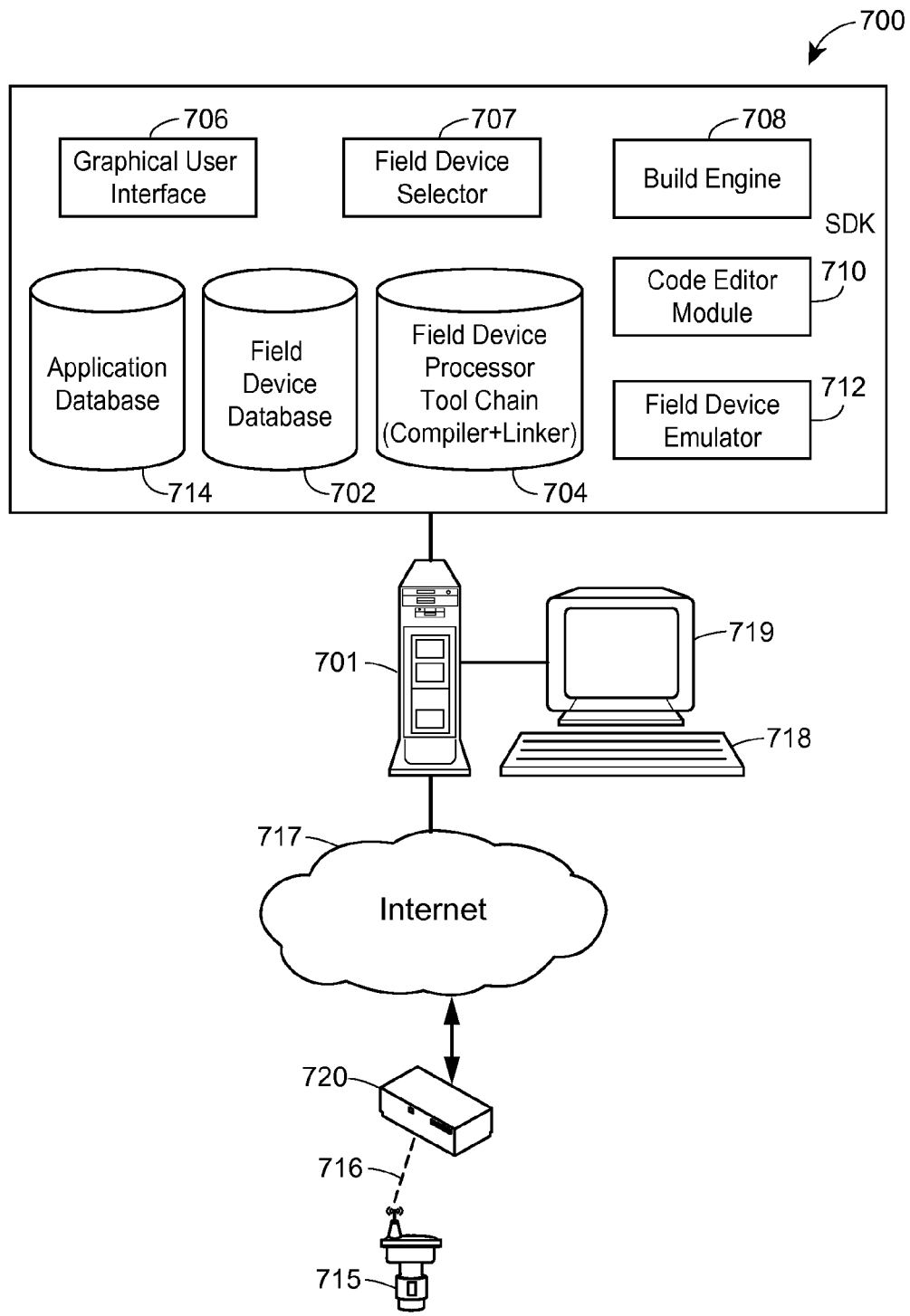
FIG. 15 is a block diagram of an example SDK which may be utilized to generate custom applications configured to utilize the application programming interface (API) of a field device, to receive and transmit IPv6 data frames via a WirelessHART communication network.

FIG. 15 provides a block diagram of an example SDK 700 which may be installed on a general purpose computer 701 to allow a developer to develop field device-specific custom applications which may utilize the application programming interface 315 of FIG. 7, for example, to receive and transmit IPv6 data frames. When executed on an IPv6-enabled WirelessHART field device 715 operating in a WirelessHART communication network 716, a custom application may be configured to retrieve field device specific configuration and status information, for example, from the IPv6 enabled WirelessHART field device 715 and transmit this information in an IPv6 data frame to the internet 717 via a gateway 720 to another computing device (e.g., the device 701).

An example SDK 700 may include a field device database 702 that may store information for some or all the models of IPv6-enabled WirelessHART field devices 107, 108, 109 and 110 referenced in FIG. 6 and the IPv6-enabled WirelessHART field device 715, for example, manufactured by a vendor. Of course, the field device database 702 may be periodically updated with newer models of IPv6-enabled WirelessHART field devices. Information for a particular model of IPv6-enabled WirelessHART field device may include the supported application programming interface, a processor identifier indicating the family of microprocessor present in the particular model of IPv6-enabled WirelessHART field device, etc.

A field device processor tool chain database 704 may include compilers and linkers that may be utilized to generate executable custom applications. One skilled in the art will recognize that each family of microprocessors may require its own unique tool chain to compile software code to generate executable custom applications.

The several databases described herein may be local to the general purpose computer 701 or may alternatively be located or "mapped" to another computing device connected to the internet 717. A graphical user interface (GUI) module 706 may allow a third-party software developer (programmer) to interact with the SDK 700. Of course, the GUI 706 may receive programmer input via a keyboard and a mouse 718, for example. Also, the GUI 706 may provide a windows-based software interface via a display monitor 719, for example. A programmer may interact with the SDK 700 to select the particular model of the IPv6-enabled WirelessHART field device 715, for example, from field device database 702 via a field device selector 707. The field device selector 707 may be represented as a drop-down menu, for example, in the GUI 706.

A build engine 708 may be used to automatically select an appropriate tool chain from field device processor tool chain database 704 when a programmer selects an IPv6 enabled WirelessHART field device via the field device selector 707. Of course, the tool chain selected would correspond to the microprocessor present in the selected model of IPv6 enabled WirelessHART field device 715, for example.

The GUI 706 allows a programmer to write software application (source code) in a code editor module 710. The programmer may instruct the build engine 708 to compile the software application and generate a custom application that may be executed in the application block 334 of the model of IPv6-enabled WirelessHART field device 715, for example. The build engine 708 will utilize the previously selected tool chain.

A programmer may then validate and test the executable custom application via a field device emulator 712. Field device emulator 712 may provide a software environment including the application programming interface 334 present in the selected model of IPv6-enabled WirelessHART field device 715, for example.

The executable custom application and the corresponding source code may be stored in an application database 714 if so desired. A plant operator may download the executable custom application via the internet 717 to the IPv6-enabled WirelessHART field device, such as the device 715, when desired. The custom application may execute in the application block 334 of the IPv6-enabled WirelessHART field device 715, for example, and utilize the API 332 to interact with device specific functions in the block 336. Similarly, the custom application may receive and transmit IPv6 data frames from and to the internet 717 via the WirelessHART communication network 717 by utilizing the functionality included in the API 332 and the techniques described herein.

As noted above, at least some of the above described example communication methods and/or apparatus for implementing these methods may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible computer readable storage medium, such as a magnetic medium (e.g., a magnetic disk or tape), a magneto-optical or optical medium such as an optical disk, or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)), IPv4, IPv6, WirelessHART, etc. represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification describes example methods, systems, and/or machine-accessible medium, the examples are not the only way to implement such systems, methods and machine-accessible medium. Therefore, although certain example methods, systems, and machine-accessible medium have been described herein, the scope of coverage of this patent is not limited thereto.

The invention claimed is:

1. A method of routing a data packet within a communication network, comprising:
    obtaining a primary data packet at a first device within the communication network as a data packet that includes first network routing information conforming to a first communication protocol that uses a first network routing protocol;
    fragmenting the primary data packet at the first device to create a set of fragmented primary data packets;
    adding a fragment header and second network routing information to each of the set of fragmented primary data packets;
    wherein the second network routing information conforms to a second communication protocol that uses a second network routing protocol, wherein the second network routing protocol is different than the first network routing protocol, and wherein the second network routing protocol comprises an implicit destination routing protocol, to thereby create an encapsulated primary data packet; and sending the encapsulated primary data packet over the communication network using the second network routing protocol from the first device to a second device.

2. The method of routing a data packet of claim 1, further comprising:

decoding the second network routing information from the sent encapsulated primary data packet at the second device to produce the primary data packet with the first network routing information therein.

3. The method of routing a data packet according to claim 2, further comprising:

using the first network routing information within the second device to deliver a payload of the primary data packet to an application within the second device.

4. The method of routing a data packet according to claim 2, further comprising:

using the first network routing information of the primary data packet within the second device to transmit the primary data packet to a further device over a second communication network that uses the first network routing protocol.

5. The method of routing a data packet according to claim 4, wherein the first network routing protocol is an internet protocol (IP) that uses IP addressing, wherein the first network routing information of the primary data packet includes one or more IP addresses, and wherein the second network routing protocol is a non-IP network routing protocol that does not use IP addressing to route data packets.

6. The method of routing a data packet according to claim 5, wherein the second network routing protocol is a Wireless Highway Addressable Remote Transducer Protocol (WirelessHART) network routing protocol.

7. The method of routing a data packet according to claim 5, wherein the second network routing protocol is a network routing protocol that uses graph routing to perform network routing.

8. The method of routing a data packet according to claim 1, further comprising:

decoding the second network routing information from the sent encapsulated primary data packet at the second device to produce the primary data packet with the first network routing information therein; and reassembling the set of fragmented primary data packets to produce the primary data packet at the second device after decoding the second network routing information from each of the set of fragmented primary data packets.

9. The method of routing a data packet according to claim 1, wherein fragmenting the primary data packet at the first device further comprises:

using a 6LoWPAN fragmenting protocol to fragment the primary data packet.

10. The method of routing a data packet according to claim 1, wherein adding the second network routing information to the primary data packet comprises:

encoding the second network routing information with an indication that the encapsulated primary data packet includes the primary data packet with the first network routing information that conforms to the first network routing protocol.

11. The method of routing a data packet according to claim 10, wherein encoding the second network routing information with an indication comprises:

setting a particular bit of the second network routing information to a particular value.

12. The method of routing a data packet according to claim 10, further comprising:

decoding the second network routing information from the sent encapsulated primary data packet at the second device to produce the primary data packet with the first network routing information by detecting the indication that the sent encapsulated primary data packet includes the primary data packet with the first network routing information that conforms to the first network routing protocol.

13. The method of routing a data packet according to claim 1, wherein sending the encapsulated primary data packet over the communication network using the second network routing protocol from the first device to the second device comprises:

sending the encapsulated primary data packet via one or more intermediate devices on the communication network using the second network routing protocol information.

14. The method of routing a data packet according to claim 1, wherein obtaining the primary data packet at a first device within the communication network as a data packet that includes first network routing information conforming to the first communication protocol that uses the first network routing protocol comprises:

receiving the primary data packet via a further communication network that uses the first network routing protocol.

15. The method of routing a data packet according to claim 14, further comprising:

using the first network routing information of the primary data packet and a stored routing table in the first device to determine if the primary data packet is to be sent to the second device on the communication network.

16. A communication device for communicating on a first communication network that uses a first communication protocol including a first network routing protocol, a data link protocol and a physical protocol, comprising:

a physical layer element, coupled to a first communication network, configured to receive and to send data packets using the physical protocol;

a data link layer stack element, coupled to the first physical layer element, configured to encode and to decode data packets using the data link protocol;

a first network routing layer stack element, coupled to the data link layer stack element, configured to encode data packets to be sent over the communication network by adding first network routing information to data packets to be sent over the first communication network with the first network routing information conforming to the first network routing protocol, and to decode data packets received via the first communication network by reading first network routing information from data packets received via the first communication network, wherein the first network routing information conforms to the first network routing protocol;

a first application layer stack element, coupled to the first network routing layer stack element, configured to execute applications that communicate on the first communication network using the first network routing layer stack element;

a second network routing layer stack element, coupled to the first network routing layer stack element, configured to encode and to decode second network routing information within data packets conforming to a second network routing protocol, wherein the second network routing layer stack element is configured to encode data packets to be sent over the communication network by adding second network routing information to data packets to be sent over the first communication network with the second network routing information conforming to a second network routing protocol that is different than the first network routing protocol, and to decode data packets received from the first network routing layer stack element by reading second network routing information from data packets received from the first network routing layer stack element, wherein the second network routing information conforms to the second network routing protocol; and a second application layer stack element, coupled to the second network routing layer stack element, configured to execute applications that communicate using data packets that use the second network routing layer stack element, wherein the first network routing layer stack element is further configured to decode first network routing information within data packets from the data link layer stack element conforming to the first network routing protocol to determine if the data packets include data associated with the second network routing protocol, to deliver the decoded data packet to the first application layer stack element if the decoded data packets do not include data associated with the second network routing protocol, and to deliver the decoded data packets to the second network layer stack element if the decoded data packets include data associated with the second network routing protocol, and wherein the first network routing layer stack element is further configured to encode data packets received via the first application layer stack element and the second network routing layer stack element.

17. The communication device of claim 16, further comprising:

a first transport layer stack element, coupled between the first network routing layer stack element and the first application layer stack element, configured to perform transport information encoding and decoding of data packets according to a transport protocol of the first communication network.

18. The communication device of claim 17, further comprising:

a second transport layer stack element, coupled between the second network routing layer stack element and the second application layer stack element, configured to perform transport information encoding and decoding of data packets according to a transport protocol of a second communication network.

19. The communication device of claim 16, wherein the first network routing layer stack element is further configured to decode first network routing information within data packets received from the data link layer stack element conforming to the first network routing protocol by reading an identifier within the first network routing information within the data packets received from the data link layer stack element.

20. The communication device of claim 16, wherein the first network routing layer stack element is further configured to encode first network routing information within data packets received from the second network layer stack element by placing an identifier within the first network routing information within the data packets received from the second network layer stack element such that the underlying data packet includes data associated with the second network routing protocol.

21. The communication device of claim 16, wherein the second network layer stack element is further configured to encode data packets to include second network routing information therein and to include a packet fragmenter configured to fragment each of the encoded data packets into two or more data packets and to provide the fragmented data packets to the first network routing layer stack element.

22. The communication device of claim 21, wherein the second network layer stack element includes a defragmenter configured to assemble two or more data packet fragments received from the first network routing layer stack element to produce a data packet including the second network routing information therein.

23. The communication device of claim 16, further comprising:

a routing table configured to store linking information that links routing information for a particular device in the first network routing protocol to routing information for the particular device in the second network routing protocol.

24. The communication device of claim 16, wherein the second network routing protocol is an internet protocol (IP) that uses internet protocol routing and the first network routing protocol is a non-IP protocol.

25. The communication device of claim 24, wherein the second network routing protocol is an IP version 6 routing protocol.

26. The communication device of claim 25, wherein the first network routing protocol is a Wireless Highway Addressable Remote Transducer Protocol (WirelessHART) network routing protocol.

* * * * *